(12) United States Patent
Johnson

(10) Patent No.: US 7,676,112 B2
(45) Date of Patent: Mar. 9, 2010

(54) OPTICAL DEVICE FOR CORRECTING GEOSTATIONARY SATELLITE IMAGERY FOR EARTH CURVATURE EFFECTS

(75) Inventor: David B. Johnson, Boulder, CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 0 days.

(21) Appl. No.: 11/741,405

(22) Filed: Apr. 27, 2007

(65) Prior Publication Data

US 2007/0292046 A1 Dec. 20, 2007

Related U.S. Application Data

(60) Provisional application No. 60/746,100, filed on May 1, 2006, provisional application No. 60/863,728, filed on Oct. 31, 2006.

(51) Int. Cl.
*G06K 9/40* (2006.01)
(52) U.S. Cl. .................................. 382/275; 359/654
(58) Field of Classification Search .................. 353/69; 359/654; 382/275
See application file for complete search history.

(56) References Cited

U.S. PATENT DOCUMENTS

| | | | | |
|---|---|---|---|---|
| 3,560,642 A | * | 2/1971 | Schroader et al. ........... | 348/147 |
| 4,621,893 A | * | 11/1986 | Lohmann .................... | 359/200 |
| 4,837,431 A | | 6/1989 | Malinowski et al. | |
| 4,934,771 A | * | 6/1990 | Rogers ....................... | 359/356 |
| 4,934,803 A | * | 6/1990 | Ealey ......................... | 359/845 |
| 5,682,034 A | | 10/1997 | Schueler | |
| 6,019,151 A | * | 2/2000 | Wen et al. ................... | 156/387 |
| 6,034,379 A | * | 3/2000 | Bunte et al. ................. | 250/566 |
| 6,219,185 B1 | * | 4/2001 | Hyde .......................... | 359/565 |
| 6,555,803 B1 | * | 4/2003 | Bremer ...................... | 250/203.1 |
| 6,894,636 B2 | * | 5/2005 | Anderton et al. ............. | 342/22 |
| 2002/0126129 A1 | * | 9/2002 | Snyder et al. ................ | 345/582 |
| 2003/0164442 A1 | * | 9/2003 | Beusch ....................... | 250/208.1 |

(Continued)

OTHER PUBLICATIONS

Johnson, David B., "New Technology Sensors for Correcting Satellite Imagery for Earth Curvature effects" Proc. Of SPIE vol. 6405 64050T-1 (Nov. 13-17, 2006).

(Continued)

*Primary Examiner*—Andrew W Johns
*Assistant Examiner*—Gregory F Cunningham
(74) *Attorney, Agent, or Firm*—Marsh Fischmann & Breyfogle LLP

(57) ABSTRACT

An optical adapter for an imaging system correcting images of spherical or near spherical bodies such as the earth during satellite image collection. An imaging system includes an image collector that collects a two-dimensional image of the body from a distance above the body such as from a satellite in geostationary orbit. The collected image is disk shaped and includes distortion due to earth curvature, primarily in the form of a loss of resolution due to the foreshortening of earth features in a radial direction extending outward from the center of the image disk. The optical adapter receives the collected image, transforms the collected image to correct the distortion, and outputs a corrected image with essentially uniform spatial resolution across the areas for which the correction is applied. An image sensor such as charge-coupled device array senses the corrected image and creates a digital representation of the corrected image.

20 Claims, 16 Drawing Sheets

U.S. PATENT DOCUMENTS

2003/0174409 A1* 9/2003 Nagaoka .................. 359/654
2004/0017491 A1* 1/2004 Stavely .................. 348/240.2
2005/0012745 A1* 1/2005 Kondo et al. ............... 345/427

OTHER PUBLICATIONS

Dixon, Tom, "Goddard Space Flight Center (NASA) Optics Branch Assessment of the GeoObs Adapter concept Paper" Jun. 15, 2006, John Wood, Jun. 7, 2006 e-mail to Tom.dixon@nasa.gof RE: GeoObs Adapter Paper.

Lee, Thomas F., et al., "Notes and correspondence NASA Modis Previews NPOESS VIIRS Capabilities," Aug. 2006, pp. 649-655.

Kahler, Von D. "Optical Correction of Earth-Curvature and Refraction Effects in Aerial Photographs by Means of Spherically ground Compensation Plates." Bildmessung und Luftbildwesen, vol. 46, Mar. 1, 1978, p. 39-46.

Lobb, Dan R., "Wide-angle optical Systems with Moderate Spectral Resolution, for Monitoring the oceans from law Earth Orbit" Proc. of SPIE vol. 5962, 59621K, (2005).

* cited by examiner

OPTICAL DEVICE FOR CORRECTING GEOSTATIONARY SATELLITE IMAGERY FOR EARTH CURVATURE EFFECTS

CROSS-REFERENCE TO RELATED APPLICATIONS

This application claims the benefit of U.S. Provisional Application No. 60/746,100 filed May 1, 2006 and No. 60/863,728 filed Oct. 31, 2006, which are both incorporated herein by reference in their entirety.

GOVERNMENT SUPPORT

The invention was made with Government support under Agreement No. NAS1-02058 awarded by the National Aeronautics and Space Administration. The United States government has certain rights in this invention.

BACKGROUND OF THE INVENTION

1. Field of the Invention

The present invention relates, in general, to satellite imagery and collecting image data from orbiting satellites such as geostationary satellites, and, more particularly, to methods and devices for correcting or improving satellite imagery or collected image data during the data collection stage so as to account for earth curvature and/or certain other effects that cause distortion or loss of resolution in an image.

2. Relevant Background

In recent years, there has been a growing demand for accurate imaging of the earth such as can be obtained from orbiting satellites. Each imaging satellite can be thought of as including an image or image data collection system that typically includes an optical system or other image collector and image sensors. For example, the satellite may be equipped with a telescope and one or more image sensors. Historically, earth imaging from a satellite has been performed using scanning radiometers, but two dimensional charge couple devices (2D CCDs) or focal plane arrays have become increasingly important for a wide variety of imaging applications, including earth observations and astronomical observations from satellites. For example, large CCD imaging sensors are currently used as the imaging sensors for the Hubble Space Telescope and in the Cassini planetary mission to Saturn and Titan. In general, 2D CCDs are simpler, faster, and have fewer moving parts than scanning radiometers. The emergence of 2D array imaging devices has the potential to significantly change earth observations by providing a greater emphasis on the resulting image and its properties.

Applications depending on space-based observing systems designed to observe large areas of the earth's surface or the atmospheric environment and clouds above the earth's surface are limited by the well known fact that the spatial resolution of imagery and geophysical sensing measurements from a satellite degrades with distance from nadir (i.e., the point in the sky directly below the observing satellite) or within the portion of the results approaching the edge of the visible earth or visible earth disk when considered as a 2D image. The loss of resolution at the edges of the image or distal to nadir is caused by a progressive foreshortening of the earth features in the image and a corresponding increase in the ground sample distances. From a satellite in low earth orbit (LEO), the foreshortening is primarily the result of oblique viewing angles coupled with increasing distances between the satellite and the earth features that are being observed. From a satellite in geostationary orbit (i.e., orbit about the earth's equator that makes the object appear motionless in the sky), issues associated with oblique viewing angles are compounded by earth curvature effects that become the dominant factor in the loss of image resolution in areas away from nadir. This loss of resolution can be so severe as to become the most important factor limiting the coverage areas for which quantitative use of the satellite observations is possible. While post-collection processing of the collected imagery can cosmetically "correct" an image for the distortion inherent in the initial observation, such remapping techniques cannot improve the inherent quality of the observation or its inherent resolution.

Earth curvature is thus the dominant factor causing loss of imaging resolution for many satellites due to a significant increase in the observation footprint or instantaneous field of view (IFOV). For example, an instrument or imaging device on a satellite in a geostationary orbit with an 8-kilometer IFOV at nadir may have a reduced resolution of 24 kilometers or worse as the instrument or device scans areas that are far from the equatorial regions at the center of the image. These edge effects are not the result of any defect in the satellite instrument or image collection system but are rather the result of the coupled geometry of the satellite and the spherical earth being studied. From an earth observation point of view, the decreased resolution proximate to the edge of the earth disk is an image defect that is typically axially symmetric around the sub-satellite point on the earth's surface. Such an image defect is readily apparent from the perspective of geostationary satellites but is also present in image data collected from satellites in other orbits.

To date, the only satellite-based observation system that has employed techniques to limit the inherent loss in image resolution towards the edge of an imaging swath is the Operational Linescan System (OLS) used by the U.S. Defense Military Satellite Program (DMSP). The OLS instrument is a scanning radiometer flown in low earth orbit (LEO). The OLS maintains its cross-track resolution by using a segmented scanning sensor that progressively turns off individual sensor segments as it points further away from nadir. In effect, the instrument reduces the physical size of its sensor element as it views the earth at increasingly oblique angles. While this approach succeeds in limiting the overall growth in the sensor footprint away from nadir, the achieved sensor resolution varies along its scanning path as sensor segments are turned off or on. This general approach is also being used for the Visible Infrared Imaging Radiometer Suite (VIIRS) instrument proposed for inclusion in the NPOESS operational polar orbiting meteorological satellite system.

Hence, there remains a need, particularly for geostationary satellites, for methods and systems that address the inherent loss in image resolution caused by the curvature of the earth and other effects. In some cases, it may be preferable that specially designed optical systems designed to be used in conjunction with large focal plane array sensing devices be used to fulfill these needs. Similar optical devices may also provide an attractive alternative to the large, mechanically complicated scanning radiometers that are currently being employed to try to address image resolution loss in low earth orbit applications.

SUMMARY OF THE INVENTION

The present invention addresses the above and other problems by providing an optical system or adapter (e.g., herein termed a GeoObs adapter reflecting its goal of providing improved geophysical observations) to transform and correct satellite imagery as part of the data collection process on the satellite or satellite platform. The correction may be thought of as providing a distortion or stretching of the image near the edges such as near the edges of the visible earth disk in embodiments where a satellite is carrying the optical system or adapter in an orbit about the earth. The optical system or adapter may be an assembly of one or more optical components such as lenses, mirrors, or other devices or systems designed to emulate optical systems that is positioned between the output of the satellite's initial image collector, e.g., a telescope or more complex optical arrangement, and an image sensor or sensors, e.g., an array of CCDs, a focal plane array, or the like. In many cases, the correcting optical system or adapter may be provided as an identifiable component integrated into the image collection system, while in other cases the functionality of the adapter described herein may be provided by modifying one or more of the standard optical components within the image collection system. In a typical embodiment, the adapter may provide the correction by progressively increasing the magnification of image elements from the center of the image or nadir in a radial direction to the edge of the image. The amount of magnification at any point in the adapter is selected to be an amount useful for accurately offsetting the foreshortening caused by earth curvature of other effects in the output of the image collector (i.e., the collected image). Such selective magnification is typically not linear with significantly larger amounts of magnification being provided near the edge of the image where the normal foreshortening of the collected image is most severe.

Generally, the GeoObs adapter is an optical device that corrects for the loss of image resolution due to angle of view and earth curvature effects. The GeoObs adapter described herein is a hardware device or a functionality built into other hardware devices provided on satellites or satellite platforms prior to launch. The adapters are well suited for use with 2D CCD imaging arrays including hyperspectral remote sensing systems that are used for sensing images of earth or a similar body from a geostationary or other orbit. In the geostationary orbit embodiment, the GeoObs adapter and image collection systems embodying such adapters can be configured to provide a corrected image upon a surface of the image sensors or imaging arrays that has substantially uniform spatial resolution extending across a large portion of the image or of the earth disk. The GeoObs adapter can readily be adapted to embodiments that provide uniform sensor resolution over broad sensing swaths using linear sensor arrays on satellites in low earth orbit or from a variety of conical scanning instruments.

More particularly, an imaging system is provided for use in transforming or correcting images of a spherical body such as the earth during data or image collection (e.g., on the satellite platform). The system includes an image collector such as a fixed telescope directed downward toward the body that collects an image of the body from a distance above the body, e.g., from a satellite platform in geostationary orbit or the like. The collected image is substantially disk shaped and includes distortion due to curvature and other effects in portions that are radially spaced apart from the center of the disk-shaped image. Significant to the present invention, the imaging system further includes an optical adapter that transforms and corrects the collected image. The imaging system also includes an image sensor such as a two-dimensional CCD sensor array with a receiving surface that senses the corrected image and creates an electronic signal corresponding to the received, corrected image. The adapter may be positioned between the collector and the image sensor or may also be provided as a component of the collector such as by providing one or more additional lenses and/or mirrors within a telescope or other collector or by modifying one or more of the originally included optical components of the collector.

The design specification of the transformations used to perform the desired image corrections and improvements provides for a variety of different image transformations whose properties can be matched to particular applications or sensor parameters. The output imagery, for example, can be transformed to correct for the loss in image resolution due to earth curvature effects or with a different transformation specification that could provide imagery with each image pixel corresponding to an equal area on the earth's surface (i.e., an equal-area transformation). With such a family of solutions in mind, the optical adapter may be configured based on a radial stretching factor that defines the amount of stretching applied to the various image segments relative to the segments location in the image relative to the center of the image, with the stretching factor being defined by a curve or equations selected to correspond to the correction chosen from the family of solutions.

DETAILED DESCRIPTION OF THE PREFERRED EMBODIMENTS

Figure 1:
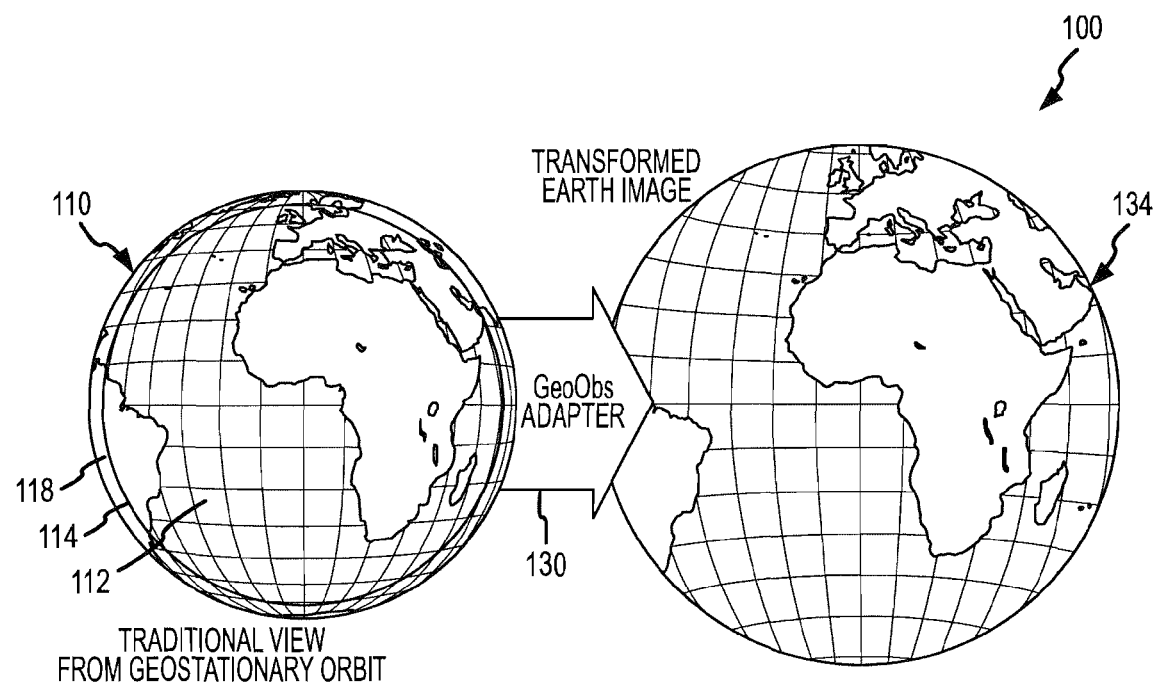
FIG. 1 illustrates an image correction process according to an embodiment of the invention in which a collected image (e.g., of a spherical body such as the earth taken from an orbit about the body) is transformed by an adapter to produce a higher resolution, transformed image.

Briefly, the present invention is directed to methods and devices for transforming or correcting observations and images collected by a satellite orbiting a spherical body such as the earth. The devices may be implemented in a corrective adapter, e.g., a GeoObs adapter, that is provided between a satellite's image collector and image sensor or sensor array or provided as part of the image collector such as on or by modification of one or more existing optical components of a telescope or other optical system on the satellite platform. Embodiments of the GeoObs adapter described in the following paragraphs provide optical devices for observing the earth and its atmosphere that can be used to provide any of a number of solutions or corrections to a raw image. For example, the adapters may be used to correct for the loss of image resolution due to earth curvature effects found near the edge of the earth disk as viewed from an orbiting satellite but can also compensate for the loss in image resolution due to increasing distance between the satellite sensor and the area being observed. Because of the unique properties of the earth observation geometry, the adapters are designed to stretch or deform the raw image distal to the center of the image or distal to nadir with more distortion or stretching performed as the distance from the center or nadir is increased (e.g., none or little distortion near nadir and significant stretching near the edge of the edge of the image or segments farthest from nadir).

In some embodiments, the adapters are hardware modifications or enhancements that are designed into remote sensing instruments or imaging systems provided on a satellite platform such as, but not limited to, imaging systems using fixed, relatively large aperture, optical systems mounted on a three-axis stabilized spacecraft or satellite in geostationary orbit. In this case, the adapters and imaging systems incorporating such adapters are well matched for use with two-dimensional CCD imaging sensors or two-dimensional sensor arrays intended for hyperspectral sensing for sounding applications. In these embodiments, the adapters and imaging systems can provide substantially uniform spatial resolution imagery extending across a large portion of the earth disk or transformed image generated by the adapter. The adapters and imaging systems of the invention may also be adapted or configured to provide data with a substantially uniform sensor resolution over broad sensing swaths using linear sensor arrays in any of a variety of conical scanning instruments or in special configurations suitable for use on satellites in low earth orbit.

The transformed image (e.g., an earth image transformed to correct for curvature of the earth by providing essentially uniform resolution over the earth disk image) is of higher quality than the raw earth image and can be more effectively used in numerical models and/or applications such as applications involving integration into operational decision support systems. The image modifications provided by the adapters of the invention are particularly valuable since they are applied or performed before the image data is used or observations are made (e.g., during image collection or during imaging on the satellite rather than during post-collection processing as is the case with software remapping of a raw image) and directly enhance the quality of the observation (e.g., see FIG. 1).

Figure 2:
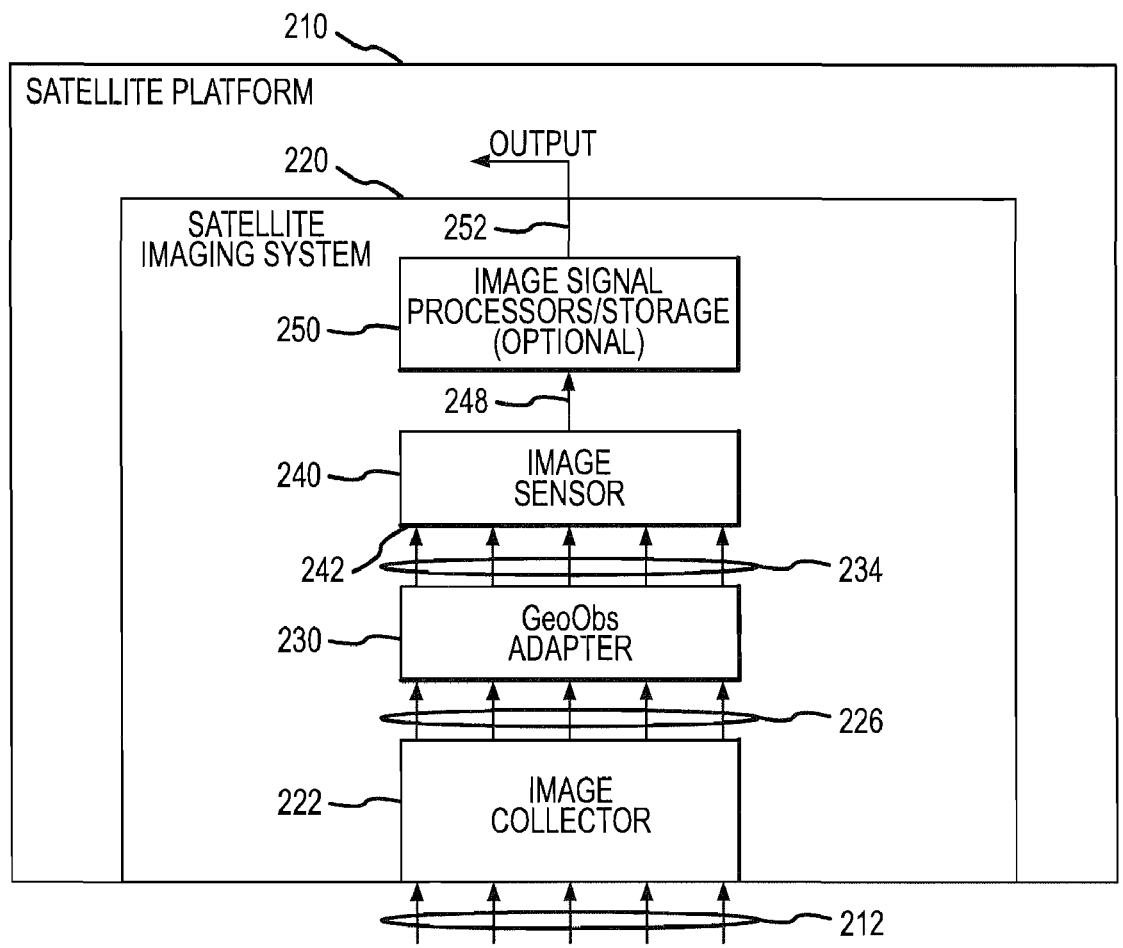
FIG. 2 is a functional block diagram of a satellite with a satellite imaging system configured according to one embodiment of the invention to include a corrective or transformative optical adapter to correct or modify an image prior to its being directed to an image sensor(s)

FIG. 1 illustrates operation of an exemplary GeoObs adapter of the invention, such as adapter 230 shown in FIG. 2. Specifically, FIG. 1 illustrates an image modification or correction process 100 in which a raw image 110 collected by a telescope or other image collection device is modified by a GeoObs adapter 130 to create or generate a transformed or corrected image 134. In the illustrated example, the raw image 110 is a traditional view from a satellite or spacecraft in geostationary orbit and may be thought of as an earth disk image. The GeoObs adapter 130 is configured to transform a portion or subset 112 of the raw image 110 defined by an outer edge or dividing line 114. The data or portion 118 of the image outside or beyond the line 114 is excluded by the adapter 130 from the transformed image 134 (e.g., the portion of the image 110 beyond a specified earth angle (as explained below) may be excluded). The portion to be corrected 112 is then deformed or stretched by the adapter 130 to produce the corrected or transformed image 134, which in this case is shown to have to have substantially uniform resolution across the entire earth image 134 rather than greater resolution at the center or near nadir and worsening resolution near the edge of the disk as seen for disk 110 near the line 114. The resolution in the center of the image, near nadir, is unchanged by the depicted transformation. In this manner, the transformed image 134 shown is not simply an enlargement of the portion 112 as the image resolution at or near the nadir remains constant or substantially constant in this example during the transformation by the adapter 130. The illustrated images 110, 134 may be generated by providing the adapter 130 in a satellite providing METEOSAT or similar imagery, and the image 134 is useful for showing the improved resolution achievable along the edges or portions of the image 112 distal to nadir (e.g., over Europe in this example).

FIG. 2 illustrates a relatively simple example of a satellite or satellite platform 210 that is adapted according to one embodiment of the invention to provide correction or transformation of a raw image as it is being collected. For example, the satellite 210 may be adapted for use in a geostationary orbit above the earth or other spherical body. Light rays 212 reflecting from the earth or body (not shown) or infrared radiation emitted by it are received at an image collector 222 of a satellite imaging system 220 provided or mounted on the satellite 210. The image collector 222 may take many forms to practice the invention such as a relatively simple telescope arrangement often provided on observing satellites or a more complicated arrangement of optical hardware and/or software components. The particular arrangement or configuration of the collector 222 is not limiting to the invention. A raw or collected image 226 is output from the collector 222. For example, the raw image 226 may be an earth disk representing a three-dimensional sphere (or nearly spherical body) as a two-dimensional or planar image.

Significantly, the imaging system 220 further includes a GeoObs adapter 230 positioned between the output of the collector 222 and a receiving or input surface 242 of an image sensor 240. The functionality of the adapter 230 is discussed in detail below, but, briefly, the adapter 230 acts to correct for "natural" distortions or losses in resolution in the raw or collected image 226 (such as by providing a stretched or deformed version of the raw image 226 that provides a desired corrected image 234 such as one that is corrected for curvature effects that become increasingly problematic as you approach the edge of the earth disk as viewed from satellite 210). The functionality of the adapter 230 may be provided in a number of ways such as with one or more mirrors, lenses, or other optical or other components that are configured and combined to deform or modify the raw image 226 to produce the corrected image 234 as described herein. The corrected or transformed observation or image 234 is output from the adapter 230 and directed toward or onto the receiving surface 242 of the image sensor 240. The image sensor 240 may take many forms to practice the invention such as a CMOS sensor, an active pixel sensor, or the like, but, in some cases, the sensor 240 is a two-dimensional CCD array (e.g., an array of charge-coupled devices that typically include an integrated circuit with an array of linked or coupled light-sensitive capacitors) that outputs an electronic image, electronic representation, or electric signal 248 corresponding to the corrected image 234. The electronic image 248 may then be further processed or stored by components 250 on the satellite 220 and/or transmitted as output 252 from the satellite 220 such as by transmission to a receiving device or receiver (e.g., a receiving station on the earth) for display, for further processing, and/or use in numerical models or other applications. The adapter 230 is shown as a component separate from the collector 222, but in some embodiments, the adapter 230 or its functionality may be provided as an integrated portion of the collector 222 such as an add-on piece of optical hardware or by modifying the shape or design of a mirror, lens, or other optical component in the collector 222.

Figure 3:
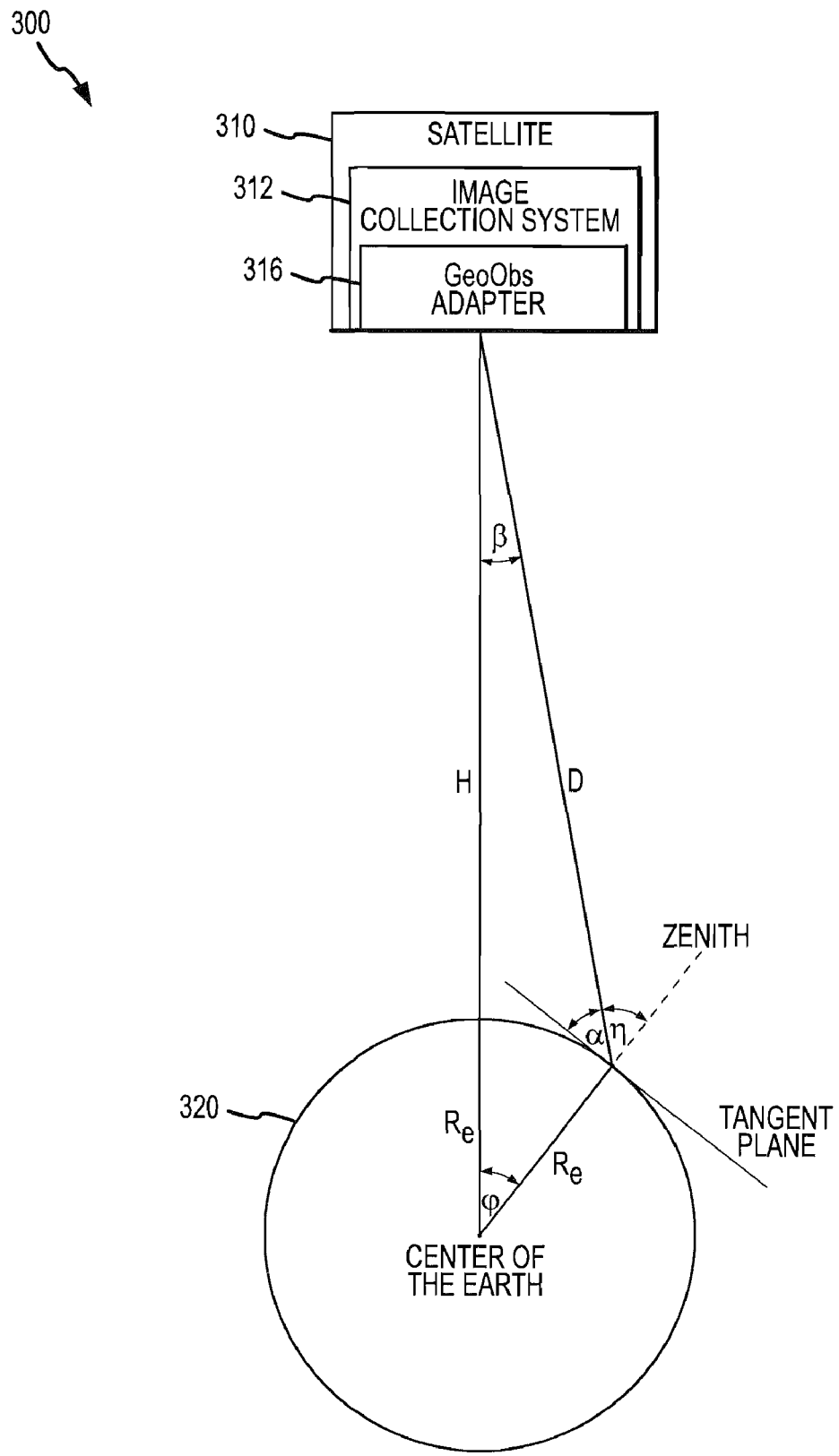
FIG. 3 is a simplified, two-dimensional diagram of earth (or other substantially spherical body) observation geometry from geostationary or other orbiting satellites (not to scale)

To provide a fuller understanding of the functionality of a GeoObs adapter, it may be useful to first discuss general geometry for earth or other spherical body observation such as from an orbiting satellite. FIG. 3 illustrates geometry involved with an imaging or observation process 300 with a satellite 310 being used to image 320 the earth (e.g., depicted as a horizontal slice through the body of the earth as viewed from the above the north pole or the like). The satellite 310 is shown with an image collection system 312 that is configured according to the invention with a GeoObs adapter 316 to provide correction or transformation of the earth image 320 collected by the system 312 such as by a fixed telescope pointed vertically downward towards the center of the earth or other spherical body 320. The parameters and/or nomenclature from FIG. 3 can be used to define the locations, viewing angles, and properties of the locations on or near the surface of the earth where H is the distance from the satellite to the sub-satellite point on the Earth's surface such as 35,790 km for a satellite in geostationary orbit or other distance determined based on a satellite orbit, $R_e$ is the spherical radius of the earth (e.g., 6,371 km), D is the diagonal distance directly from the satellite to a point on the earth's surface, α=satellite elevation angle as viewed from a point on the earth' surface, and η=satellite zenith angle as viewed from a point on the earth's surface. The angle β is the angular offset from nadir to a point on the earth's surface from the perspective of the satellite, and the φ, termed the "earth angle" in the following discussion is defined as the great circle angle between the line from the satellite 310 to the center of the earth and the line from there to a point on the earth's surface. The earth angle, thus, represents a measure of the radial distance along the earth's surface from nadir to any point on the earth's surface, and it may also be described as the earth-referenced angular offset from nadir. From geostationary orbit, the earth angle, φ, for any position on the equator is the difference in longitude between the sub-satellite point and the observation point. Similarly, the earth angle, φ, of any point directly north or south of the sub-satellite point is the absolute value of the latitude.

FIG. 3 shows the geometry and terminology of earth imaging, and it also highlights parameters that control the loss of image resolution and foreshortening of earth features when images are collected from an orbiting satellite. The satellite zenith angle controls the expansion of a satellite sensor's (e.g., an imaging sensor in system 312) footprint due to earth curvature effects and an oblique viewing angle as it moves away from nadir. The relative sensor footprint due to curvature, as compared to its footprint at nadir is provided by the following expression:

$$\frac{1}{\cos\eta}$$

And the corresponding increase in sensor footprint due to the increased oblique distance to a point on the earth's surface, as compared to the sensor footprint at nadir is provided by the following expression:

$$\frac{D}{H}$$

The equations provided above help define the image plane projection, the variability in the relative footprint size due to earth curvature, and the additional changes to the footprint due to the increased distance from the satellite as the collected image or image data becomes more distal or spaced apart from nadir. Interestingly, the curvature effect only increases the instrument or system 312 footprint in the radial direction while increasing the distance from the satellite 310 to the surface of the earth 320 increases the sensor footprint in both radial and lateral directions. Note, this geometrical treatment or description of earth observation geometry assumes a spherical earth, but such an assumption is likely allowable for exploring the properties of the earth images as seen from geostationary orbit and for defining the transformations useful for making corrections to the raw image to obtain a desired transformed or corrected image by a GeoObs adapter 316. However, the above treatment does include parallax and angle of view considerations. A more detailed elliptical earth model including deviations from the standard geoid due to terrain features may, however, be used in certain mapping of image pixels in the transformed image to actual locations on the earth's surface.

Figure 4:
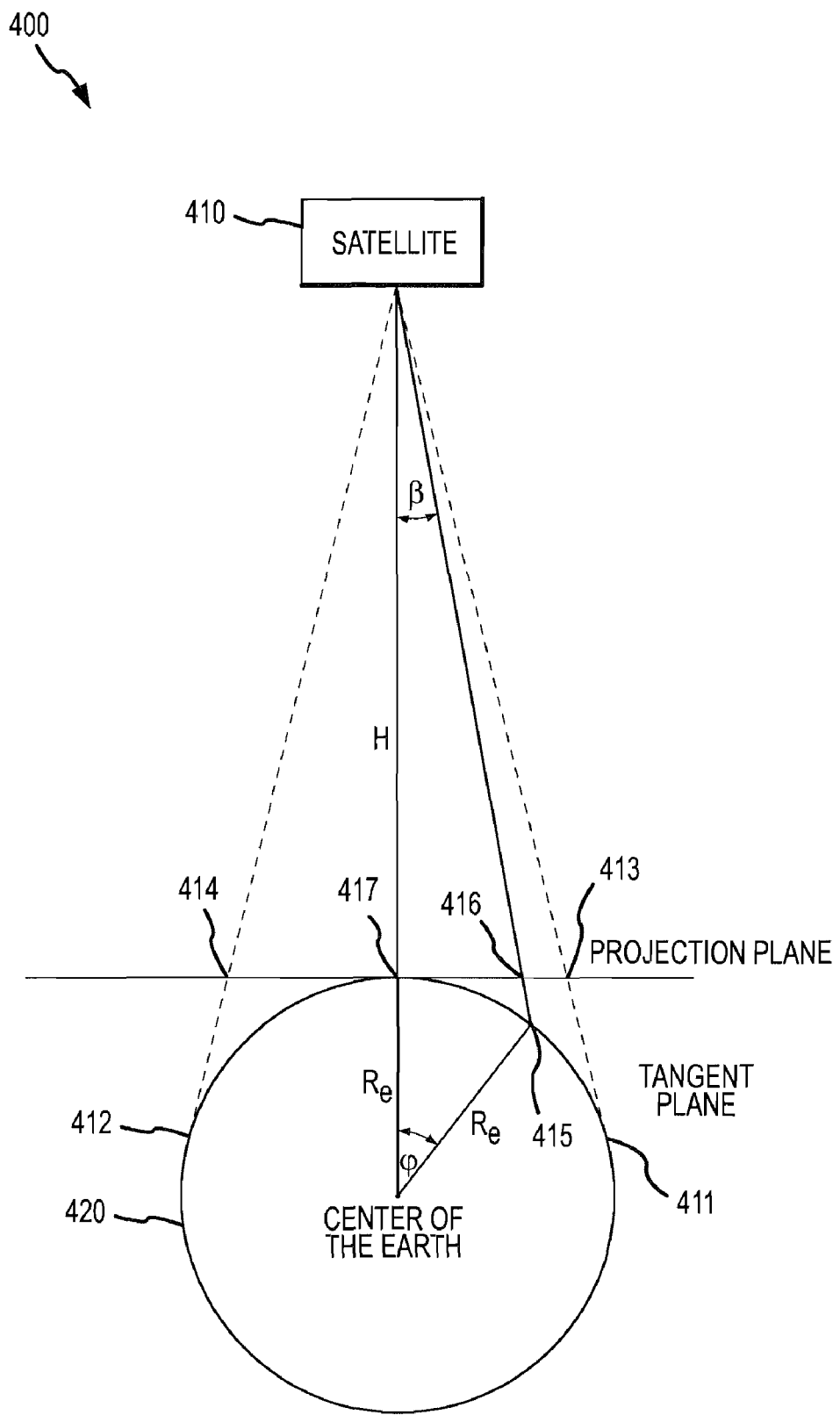
FIG. 4 is a diagram similar to that provided in FIG. 3 providing observation geometry from a satellite with an adapter and/or imaging system according to the invention such as shown in FIG. 3 showing the geometrical creation of a projected earth image such as would be seen or received by a 2D image array (such as a 2D CCD array)

FIG. 4 illustrates the same geometry 400 as FIG. 3 but in terms of a depiction of how the earth's geometry would appear after being projected onto a plane of projection oriented normal to the direct line of sight from the satellite 410 to the center of the earth, passing through nadir 417, and tangent to the surface of the earth 420 at nadir 417. The earth image, as projected onto this plane, represents the image of the earth as would be seen by a similarly oriented 2D CCD or other flat focal plane array detector used as part of the satellite's image collection system. The size of this two-dimensional reduction of the earth's visible features, along with the corresponding atmospheric features and clouds, is determined by the projection of the intersection points of the set of limiting tangent planes which define the maximum field of view of earth features as seen from the satellite.

Areas of the earth 420 beyond the intersection points 411 and 412 are outside the field of view of the satellite and represent an absolute limit to the possible imaging area. These limiting points, when projected onto the plane of projection at points 4-13 and 414, establish the size of the projected earth image 420 as seen from the satellite 410 and can be used to define a viewing coordinate system in terms of the radial distance from the center of the projected earth image 417 out to the edge of the visible earth as seen from the satellite 413 and 414. The center of the image can be defined as the zero or reference point, with the extreme geometrical limits of the projection 413 and 414 defined as unity (1.0). This is a natural reference frame and can be directly translated to apply to the earth image as observed and recorded on the similarly oriented two-dimensional sensor array on the satellite.

Positions on the surface of the earth, such as 415, will also be projected onto the plane of projection, in this case being positioned at the projection point 416. The radial specification of this point can be defined as:

$$x = \frac{\tan\beta}{\tan\beta_{max}} \approx \frac{\beta}{\beta_{max}}$$

where, as already defined in FIG. 3, $\beta$ is the angular offset from nadir to a point on the earth's surface from the perspective of the satellite. For a satellite in geostationary orbit around the earth, $\beta_{max}$ is 8.7° and the corresponding earth angle, $\phi$, is 81.3°.

Figure 5A:
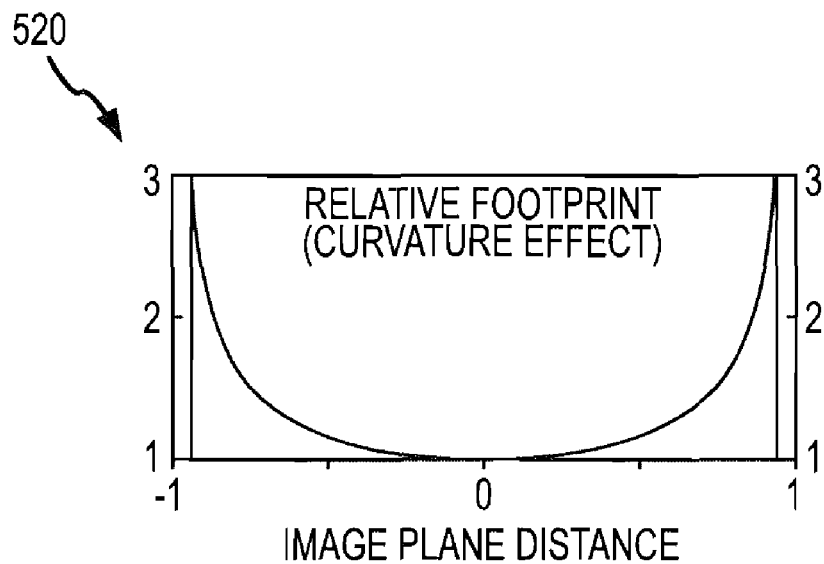
FIGS. 5A and 5B are plots of the relative footprint dimensions due to curvature and distance effects as functions of their positions for an arbitrary slice across the earth disk going through nadir.
Figure 5B:
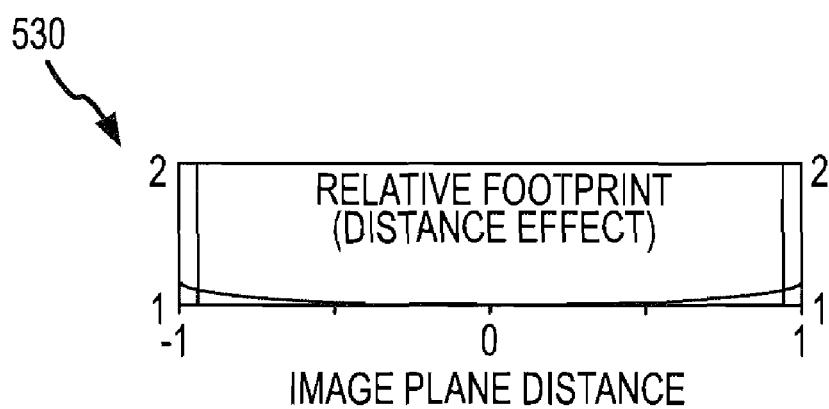

FIGS. 5A and 5B provide plots 520 and 530 of plots of the relative footprint dimensions due to curvature and distance effects as functions of their positions on the image plane for an arbitrary slice across the earth disk going through nadir for a satellite in geostationary orbit. The relative footprint due to curvature effects increases from 1.0 at nadir (i.e., no curvature effect) to values beyond 3.0 as you approach the edge of the visible earth disk and would eventually approach infinity at the edge of the earth disk. Obviously, there is a limit to the domain for which curvature corrections are reasonable. Beyond just issues of image resolution, remote sensing observations and imagery also degrade near the edge of the visible earth disk due to increasingly long, low-angle path through the atmosphere (e.g., looking at things from not far above the local horizon). As a practical matter, curvature corrections are also limited by the required size of the CCD sensor arrays and volume of data generated by images that are progressively enlarged to order to incorporate additional coverage towards the edge of the images. For these reasons, most embodiments of the GeoObs adapter are expected to be used to provide correction in regions extending from the center of the earth image out to distances of about 95 percent of the way to the edge of the visible earth image, corresponding to an earth angle offset, $\phi$, of about 62.5° for a satellite in geostationary orbit. At this point, the curvature effect for a geostationary satellite reaches a value of approximately 3. It should be emphasized, however, that this threshold is relatively arbitrary and, in principle, the GeoObs adapter corrections can be extended out to significantly larger domains. Ultimately or practically, the limiting extent of the correction is a design issue to be evaluated on a case-by-case basis in terms of the overall system design and operating parameters. The vertical lines at the edges of the plots 520 and 530 thus highlight one particular choice for the expected limit for image correction using a GeoObs adapter configured according to the invention. From geostationary orbit, the relative footprint expansion and corresponding loss in image resolution due to distance effects shown in plot 530 are relatively minor when compared with the much more significant curvature effects.

As mentioned above, a typical embodiment of a GeoObs adapter is well suited for use in satellite imaging systems that utilize one or more fixed earth-pointing telescopes with their imagery generated through two-dimensional CCD arrays or other image sensors such as other focal plane array sensing devices. This is advantageous because it is likely that such instrument configurations are likely to become increasingly more common as they reduce the need for the imaging device to scan mechanically and are considered more reliable. In relatively simple embodiments, the GeoObs adapter may be provided as an element of a single-telescope imaging device pointing directly at nadir. However, GeoObs adapters of the invention may also be used in other configurations and imaging systems such as systems using fixed, off-axis fields of view with positioning and orientation of the telescope relative to the earth disk being fixed. Such alternative embodiments may be used in the form of conically scanning instruments or imaging systems. Further, one or more GeoObs adapters may be employed in hybrid imaging systems such as "pushbroom" scanners with the GeoObs adapter being employed in a one-dimensional application to maintain the instrument resolution across the full width of the imaging swath.

The GeoObs adapters of the present invention are configured with an understanding that the foreshortening of the earth's features due to curvature effects and the angle of view act in a radial direction. With this in mind, the adapters are designed to "correct" the raw image by selectively stretching it in the radial direction by a large enough amount to offset such foreshortening. With use of the GeoObs adapters points on the successfully transformed image exhibit linear or near-linear relationships between their earth angle and their radial distance from the center of the transformed image or other desired transformations as might be provided by the adapter.

Figure 6:
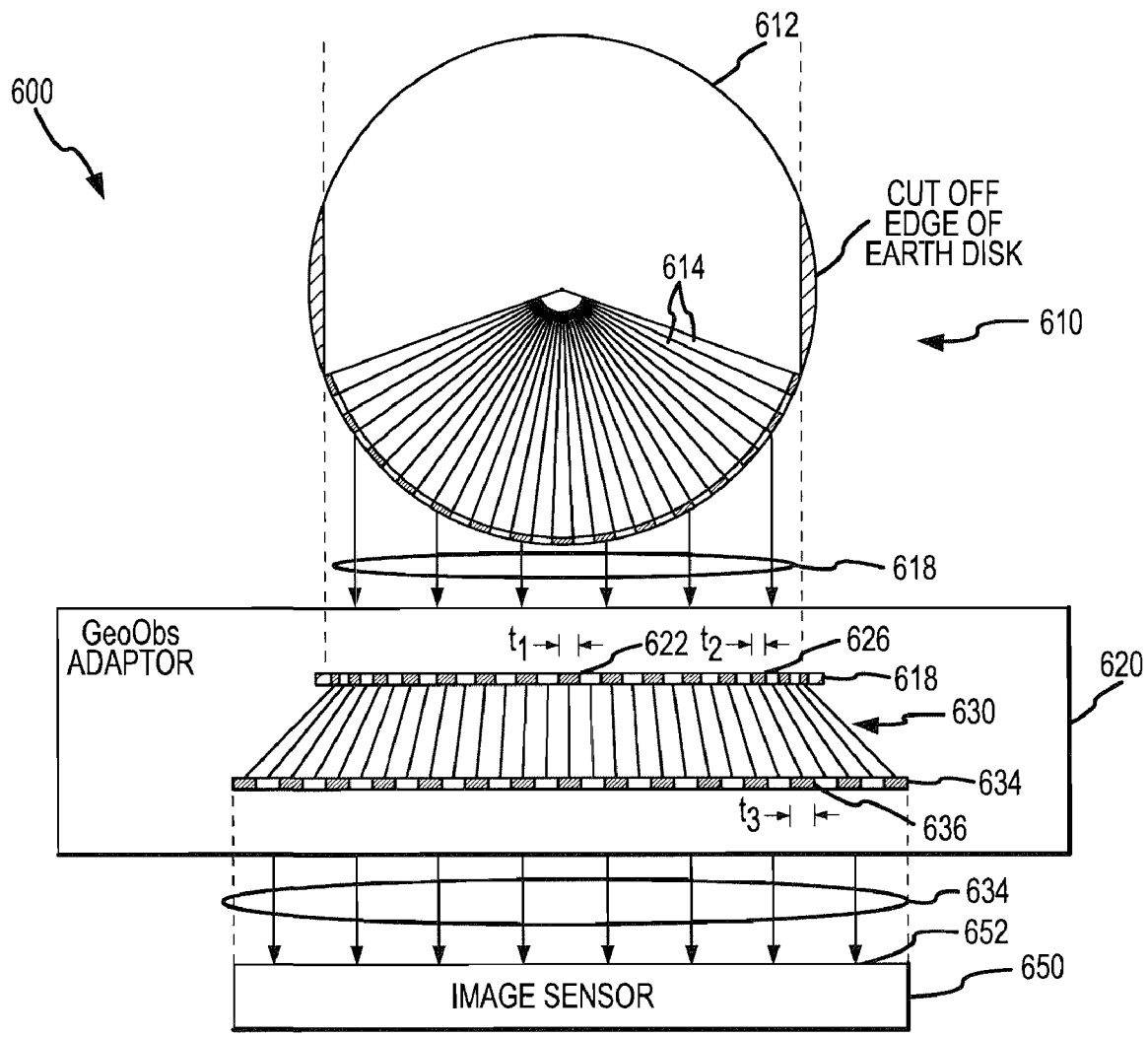
FIG. 6 illustrates functionally the flow of an image or image data through a satellite imaging system according to an embodiment of the invention showing the stretching of a raw, collected image to generate a remapped or transformed image that provides substantially uniform resolution and segment size throughout an image provided to an image sensor or array surface.

With these relationships in mind, FIG. 6 illustrates functionally a transformation process 600 provided by an embodiment of a GeoObs adapter 620 of the present invention (such as may be used in the satellite imaging system 220 of FIG. 2). The GeoObs adapter 620 is shown with a one-dimensional schematic, and its label of "GeoObs adapter" reflects one of its functional goals of enhancing geostationary earth imagery for geophysical observations and applications. As discussed earlier, the adapter 620 may physically be implemented through the use of one or more lenses, mirrors, or other optical devices or its functionality might be incorporated into other existing optical components. In FIG. 6, a preliminary collection step 610 is provided in which a raw or uncorrected image 618 is collected 610 and may be an output of a satellite collecting device or system (such as a telescope or the like not shown in FIG. 6). The raw image 618 is represented by a horizontal slice through the earth disk 612 along the equator, depicted as if looking down at the slice through the center of the earth from above. Even angular intervals or image segments 614 in earth angle (e.g., equivalent to longitude intervals in this slice 612) are indicated along the equator, highlighted by alternating blocks of black and white. As discussed earlier, this embodiment extends across most of the width of the visible earth disk as viewed from the satellite but does not attempt to perform image corrections all the way to the edge of the visible earth disk. The output or raw image 618 is passed to the GeoObs adapter 620 for correction or transformation of the image 618 to remove or reduce foreshortening or other distortion inherent in collection 610.

In the raw earth image 618 that is projected onto the adapter 620, the image segments 622 near the center of the image (or nadir) have a width, $t_1$, that is larger or greater than the width, $t_2$, of image segments 626 near the edge of the raw image 618. The compression or convergence of the outer or edge segments 626 represents a foreshortening of earth features due to the curvature of the earth. Transformation or correction 630 of the earth image intervals or segments 614 is provided by the adapter 620 by progressively stretching a remapped image plane projection 634. For example, the near edge segments 636 in the transformed or corrected image 634 are stretched or modified by the adapter 620 so as to have a third width, $t_3$, that is greater than the prior width, $t_2$, and that is equivalent to or nearly equivalent to the width, $t_1$, of center segments or intervals 622 in the raw image 618. The width of image segments near the center of the image, such as 622, are not changed by the transformation or correction 630 in the illustrated embodiment. In one embodiment, the adapter 620 acts in modification process 630 to stretch the image 618 in the same but reciprocal proportions to offset the foreshortening found near the earth disk edges. As shown, the corrected or transformed image 634 that is output or transmitted from the adapter 620 such as to a receiving surface 652 of an image sensor 650, e.g., a two-dimensional CCD array or the like) is larger in diameter than the original raw earth image 618 input to the adapter 620, reflecting the enhanced resolution achieved at the outer edges of the corrected image. The enlargement will vary based on the amount of foreshortening that is corrected and whether the corrected image provides substantially uniform resolution in the image intervals or segments (as shown). In some preferred embodiments, the corrected image 634 has substantially uniform resolution in the image segments across the image or earth disk image and the image 634 is larger in diameter than the raw image 618 by a factor of about 1.3, corresponding to an adapter designed to provide image corrections out to an earth angle, $\phi$, of approximately 62 degrees.

In brief, FIG. 6 illustrates one useful implementation of a GeoObs adapter of the present invention in which resolution at nadir or the center of the image 618 is preserved in the corrected image 634 while also providing a constant or nearly constant radial resolution across the entire earth image (or at earth angles or offsets from nadir of less than about 62 degrees). One design goal of the adapter may be to progressively magnify and expand in area the image with increasing distance from the central axis of the optical system which may be pointing at nadir. This provides an increase in the overall size of the corrected earth image but with a uniform IFOV across the image area. In this embodiment, the image 634 has an increased diameter, and hence, the image sensor 650 may be configured with a larger receiving surface 652 than would be used to sense the raw or uncorrected image 618 (e.g., larger CCD). For example, a two-dimensional adapter 620 would preferably be paired with an image sensor 650 with a two-dimensional CCD (or other sensor) that has about twice the total number of pixels (e.g., 1.3 by 1.3) as needed for the original, unstretched image 618 so as to receive the corrected or transformed image 634. The adapter 620, however, is desirable as it improves the resolution at the edge of the useful earth disk by a factor of three. In contrast, to provide this sort of resolution at the edges of the earth disk without the use of an adapter 620 by simply switching to a larger, higher pixel count CCD, an image sensor would need to be increased in size by nearly a factor of 10 (e.g., 3 by 3), and such a solution is unduly expensive, may be beyond the size or capabilities of current sensor arrays, and may require greatly augmented data transmission capabilities.

Figure 7:
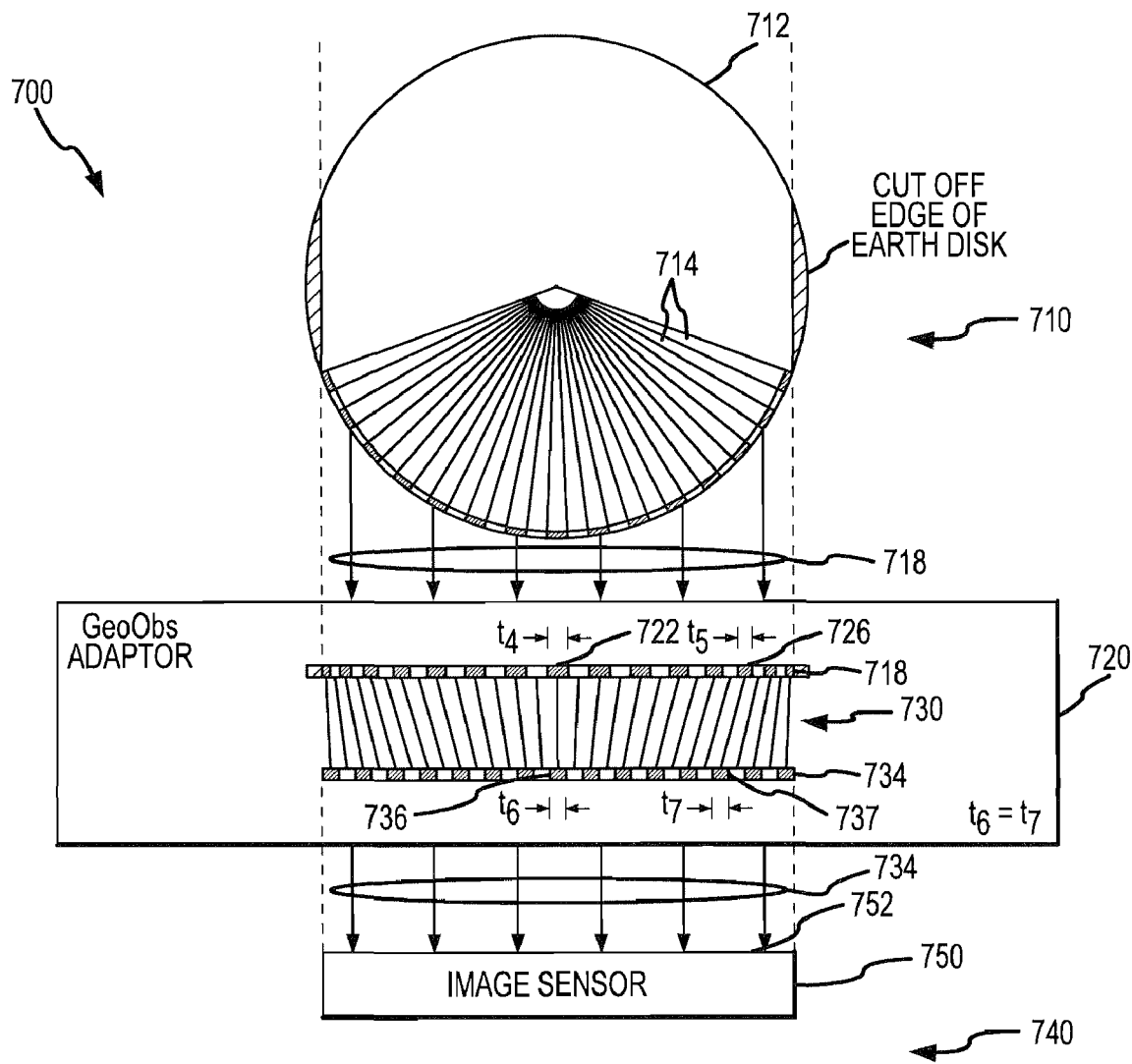
FIG. 7 illustrates the functionality of a satellite imaging system, similar to FIG. 6, showing an adapter configured to form a transformed image for presentation to an image sensor with substantially uniform resolution or sized segments and also having substantially the same size as the raw data image.

In some cases, it may not be possible or not be desirable to increase the size of the sensor array as illustrated in FIG. 6. The GeoObs adapter, for example, may be adapted for use with existing or standard sized sensors such that the corrected image is sized to be about the same size as the raw or uncorrected image received at the adapter from the collecting device. Such an image correction process 700 is shown in FIG. 7. In this process 700, image collection 710 is performed to transform an earth image 712 similar to that shown in FIG. 6 with intervals or segments 714. The raw image 718 is provided to a GeoObs adapter 720 and foreshortening causes center image segments 722 to have a width, $t_4$, that is greater than a width, $t_5$, of image intervals or segments 726 near the edge of the raw image 718. The adapter 720 stretches or transforms 730 the image by remapping the image plan projection to one in which uniform resolution is provided (e.g., image segments 736 near the center are sized with a width, $t_6$, equal to or substantially equal to the width, $t_7$, of edge segments 737). The corrected or transformed image 734 is output to a receiving or input surface 752 of an image sensor 750. The remapping 730 performed by the adapter 720 may be performed in two steps by one or more optical devices that act to create uniform resolution in an image of any particular size (e.g., the enlarged image shown in FIG. 6) and then to adjust or change the size of the image 734 to match the size of the input surface 752 (in this case resizing the image 734 to match the size of the uncorrected image 718). This sizing back to the original image size results in a small loss in the maximum resolution at the center of the image at nadir as compared to the raw images but allows for uniform resolution imagery across the full output image and significantly higher resolutions near the edges of the visible earth disk.

A differentiating feature of the adapter 720 compared with adapter 620 is its resizing of the remapped image back to the dimensions of the original image and with the sensor or CCD selected for use with such image. This resizing may be done with a separate lens or by incorporating both the stretching and shrinking into a single optical component. Regardless of the physical implementation, the GeoObs adapter 720 shrinks the center portions of the image to permit the same relative magnification of the image at segments distal from the center as was shown in the process 600 of FIG. 6 without enlarging the overall dimensions of the remapped image 734. The result is a modest loss in resolution at the center of the image (e.g., by a factor of 1.3 in this example), while permitting a significant improvement in resolution towards the edges of the earth disk. Significantly, such a trade off is not inherent in the GeoObs adapter concept but may be provided to allow an adapter to be used to suit a pre-existing design in which the image sensor has already been selected and/or sized.

Figure 8:
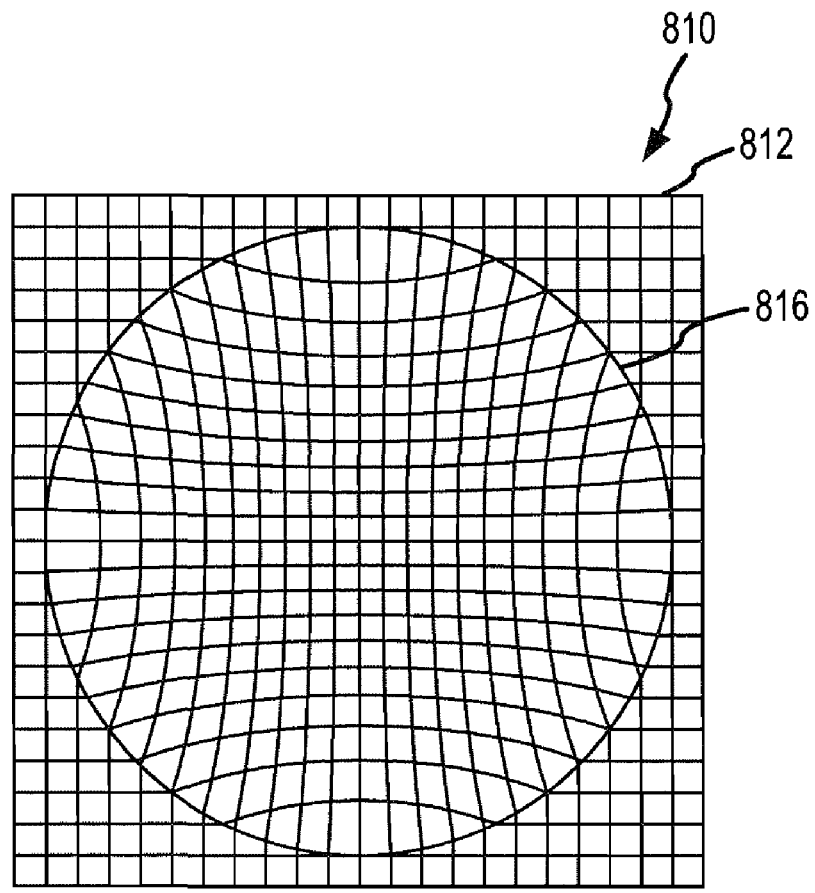
FIG. 8 illustrates a test case for implementation of an optical adapter of an embodiment of the invention showing pincushion deformation achieved or results when applied to a square grid.
Figure 9A:
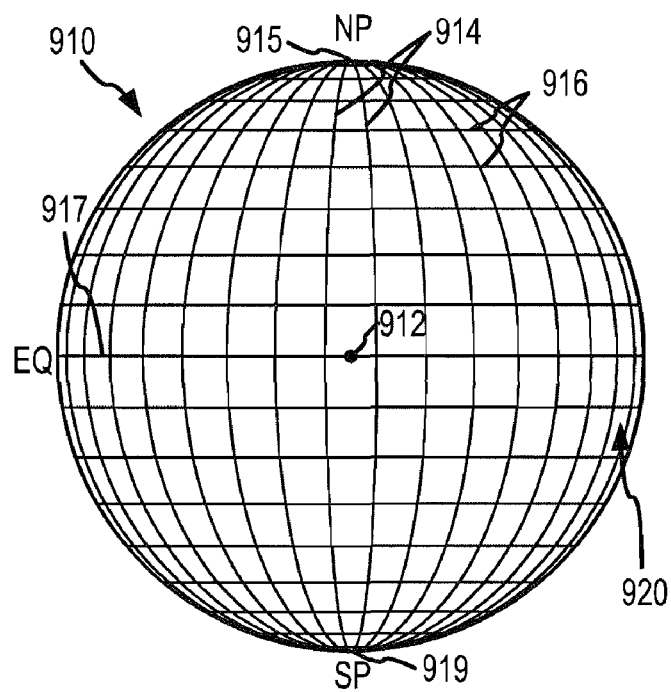
FIGS. 9A and 9B illustrate a test case for implementation of an optical adapter similar to the one applied to achieve the results shown FIG. 8 showing distortion experienced or found in a raw image of the earth or similar spherical body and when a pincushion-type adapter of the present invention is applied to the earth image to produce a corrected image.
Figure 9B:
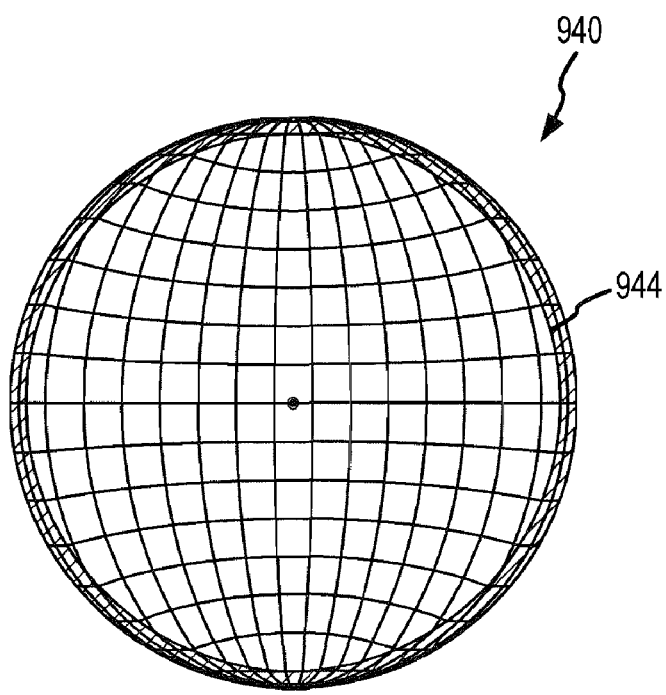

The image transformations described by FIGS. 6 and 7 are based exclusively on radial stretching of the original perspective view of the earth from space. To understand the operation of the GeoObs adapter, it is useful to examine some test cases that reveal the nature of the image transformation. FIGS. 8, 9A, and 9B illustrate properties of an adapter configuration that may be useful in the GeoObs adapters. Plot 810 is based on a numerical model of the properties of the corresponding GeoObs adapter that is used to generate a transformed image shown in the circular region 816 from a square grid pattern 812. Plot 940 of FIG. 9B illustrates application of a similar adapter to generate a corrected image shown within circle 944 of an earth image or earth disk. The limits of the transformed area are delineated by circle or line 816 (with the transformed portion being within the line 816). The resultant image within line 816 exhibits a classic example of what is known in the field of optics as a pincushion distortion.

In plot 940, the adapter numerically modeled in FIG. 8 is applied to a simplified earth image (e.g., essentially an orthographic image of a spherical earth that neglects parallax and angle of view considerations) with lines of equal longitude and latitude drawn on the surface of the sphere. FIG. 9A illustrates a raw or uncorrected image 910 of the earth that is corrected as shown in 940 by an adapter. For example, FIG. 9A provides a plot 910 of an earth disk or uncorrected image of earth that provide a view of traditional satellite view geometry (such as obtained from a GOES-WEST satellite or the like). In this modeling, it is assumed that the earth is spherical and parallax effects are neglected. These simplifications, however, preserve the geometrical and earth curvature effects in a test that approximates the transformations required for real-world applications. FIG. 9A illustrates a plot 910 that provides a grid of longitude lines 914 and latitude lines 916 (e.g., with 10 degree intervals for latitude and longitude) and also shows nadir 912, the equator 917, and the north and south poles 915, 919. The grid 910 shows the foreshortening of the earth image as seen from space (i.e., from an imaging system on a satellite above nadir 912) near the edge 920 of the image or earth disk (i.e., area or portion of the image distal or spaced apart from nadir 912). The plot 940 in FIG. 9B shows the modification experienced by the simplified earth image 910 after application of the GeoObs adapter model. In this case, the plot 940 within the limits of the adapter's coverage as shown by line 944 have been distorted and flattened into a projection that is suggestive of a standard map surface with improved resolution of the areas near the edge of the transformed image. Plot 940 reveals the expected transformations that can be obtained by application of the GeoObs adapter embodiments described herein to geostationary satellite imagery.

The schematic illustrations shown in FIGS. 6 and 7 may be generalized through the use of a quantitative, two-dimensional axisymmetric lens simulation model, which can be used to define the desired transformations preferred for various embodiments of the GeoObs adapter. The radial component of the model is specified by a set of equations that specify the desired output distance from the image center as a function of the input distance from the image center based on either the geometrical treatment illustrated in FIGS. 3 and 4 or integrating the relative footprint equations. In this lens model, the defining equations, of course, act in a radial direction without changes to the azimuthal component. Even though the optical adapter typically only acts in the radial direction, the radial stretching of image features in this polar coordinate system introduces a corresponding lateral spreading. For example, in the embodiment of FIG. 6, an object at the outer edge of the adapter 620 (i.e., radial distance of 0.94 of the width of the full earth image) would be repositioned to a radial distance of 1.3 from the center of the image, with corresponding increases in its lateral spread by about 30 percent of the object's original width. The corresponding radial dimensions (after being transformed), on the other hand, maintain a functionally constant distance scale across the extent of the adapter's optics.

This typically means that while the GeoObs adapter in its primary earth curvature correction embodiment generates an essentially equal distance image in all radial directions. The transformation is not an equal area transformation. In this sense, the properties of the GeoObs transformation may be thought of as paralleling transformations used in the world of cartography and reflect problems of mapping a three-dimensional object onto a two-dimensional surface. The image projection plane depiction of the remote sensing geometry shown in FIG. 4, in fact, is essentially identical to the projection plane depiction used to describe the azimuthal family of map projections. The distinguishing feature of the azimuthal family of map projections is that the various standard map projections in this family only differ from each other in the radial mapping of the earth features. The earth curvature correction derived in the context of developing the GeoObs concept is thus a close approximation to the standard equatorial azimuthal equidistant map projection with the only difference being the map projection's inclusion of a radial correction for the additional foreshortening generated by the distance effect (e.g., see FIG. 5B). The map analogy thus expands the applicability of the GeoObs adapter concept to a whole family of slightly different mathematical formulations that could logically be used with the GeoObs adapter. For example, it is possible to slightly under-correct the radial distances as you move towards the edge of the earth disk by just enough to offset the corresponding lateral expansion and, thereby, generate a true equal-area transformation. In the world of maps, this projection is called the Lambert azimuthal equal-area projection. Similarly, the GeoObs adapter could be configured to emulate an equatorial stereographic map projection, and it is not just a coincidence that the transformation test case shown in FIG. 9B produced a sample earth image that looked like a map.

Figure 10:
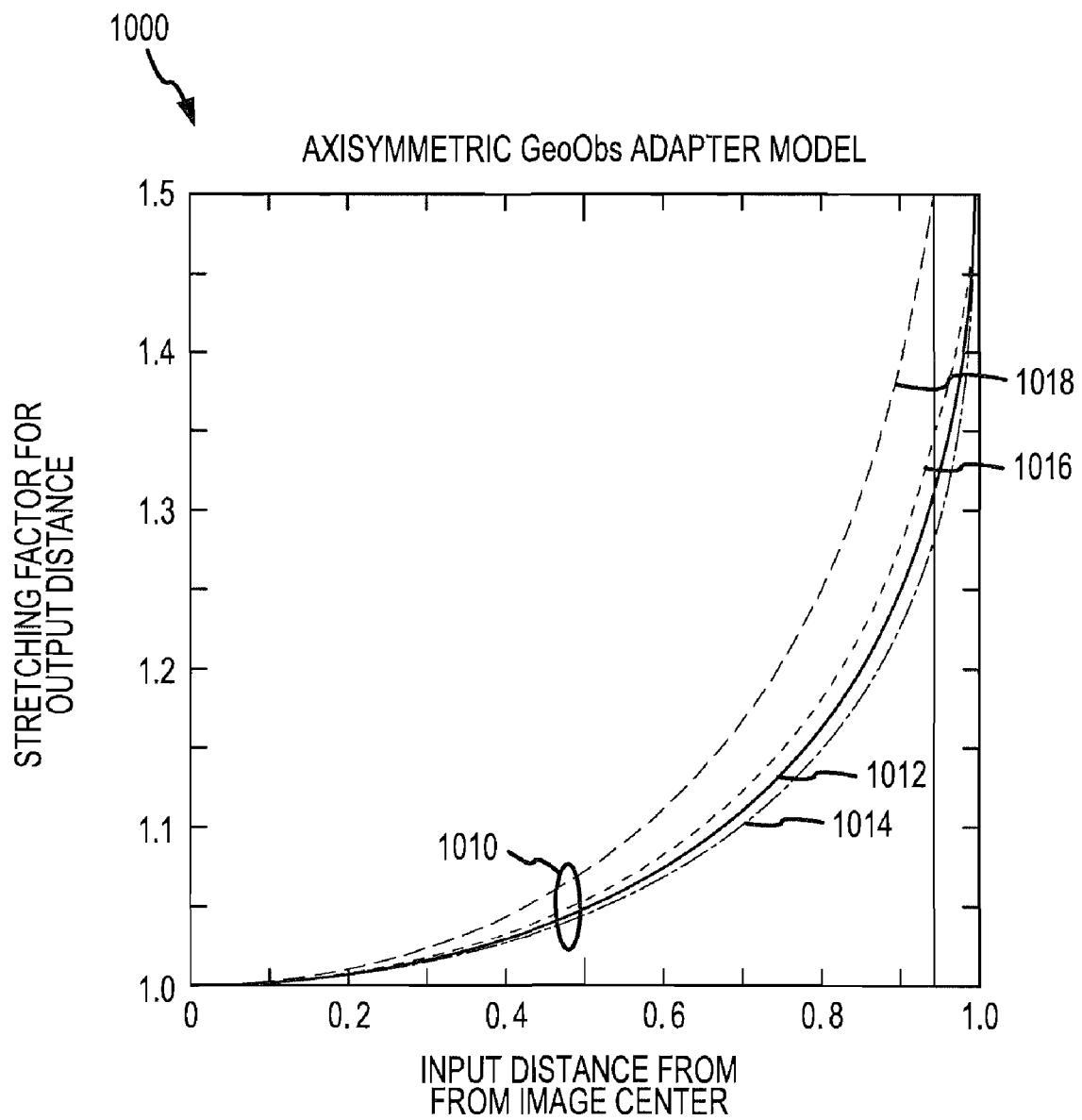
FIG. 10 is a graph of the results of one useful model for defining the functionality of an adapter configuration of the invention to provide transformation or correction to suit a particular family of solutions (e.g., to provide curvature correction, to provide equal area transformations, and the like)

FIG. 10 provides a graph 1000 of the defining quantitative descriptions for a number of the possible transformations that can be achieved through the use of the GeoObs adapter embodiments of the invention. Graph 1000 is presented in terms of a "stretching factor" depicted as a function of the input distance from the image center of the perspective earth image seen by a satellite, with the radial distance from the center of the earth image to edge of the visible earth disk defined as a value of one. A point on the raw earth image approximately 0.7 of the way between the center and the edge of the earth image, for example, may have a stretching factor of about 1.1, which means that in the transformed image that point would be moved to a distance of almost 0.8. The prior figures and discussions described adapters that were configured to provide a solution or transformation that produced a uniform resolution to correct for curvature correction. This is just one solution shown by the curve 1012 in the family or group of transformation solutions 1010 that may be provided by GeoObs adapters of embodiments of the present invention. Other transformations that may be achieved include the equal-area transformations (as discussed above) shown by curve 1014, equidistant transformations shown by curve 1016, and stereographic transformation shown by curve 1018. Adapters configured with stretching factors defined by these curves will provide the corresponding transformations in a corrected or transformed image from a received raw or uncorrected image (e.g., an image of the earth obtained by a telescope or the like in a satellite platform). The stereographic transformation is somewhat different from the other transformations described in that it not only corrects for the normal loss in image resolution with distance from the center of the image but actually enlarges the distant features in what is called a conformal mapping.

The graph 1000 shows representative amounts of stretching needed to correct for the loss in sensor resolution due to earth curvature effects along with some other factors including oblique viewing angles and increasing distance between the sensor and the earth's surface. The graph 1000 is typically useful for corrections provided for an imaging system on a satellite in geostationary orbit and may be labeled or thought of as an "Adapter Model Definition." Briefly, the graph 1000 presents one possible, but not limiting, design for transformations useful to implement and construct embodiments of the invention. One useful feature of the GeoObs adapter is that it is not linked to any one specific design formulation or line/curve in the graph 1000 but is, instead, useful with a family of solutions (such as but not limited to family 1010) that can be compared and evaluated for any particular user need or application, which is one reason graph 1000 is shown with separate defining mappings for options to simply correct for earth curvature 1012 or to remap the imagery being collected into standard map projections such as curves 1014, 1016, and 1018. The "standard" map projections are included in the family 1010 to emphasize likely uses or applications of the GeoObs adapter whose transformations are well known and understood. The graph 1000 may be used simply by taking a position on the perspective earth image from space (e.g., a position on the horizontal x-axis), moving up to the design line of your choice, and reading the needed design expansion or stretching factor off the vertical y-axis. The input distance specification along the x-axis has been normalized by the observed size of the earth disk from the satellite, thus going from 0 to 1.

The GeoObs adapters of the present invention coupled with high resolution, two-dimensional imaging systems offer the promise of more uniform resolution imagery over almost the whole earth disk as viewed from space. This will enhance the quality of space-based observations for use in numerical models or for applications involving integration into operational decision support systems. In addition, the transformations provided by the GeoObs adapters significantly improve the image resolution toward the edge of the earth disk, and these modifications or transformations are particularly valuable since they are applied before the observations are made (e.g., during data or image collection) and directly enhance the quality of the observation and are not simply post-image collection processing or software remapping of the imagery after the fact. As described above, one preferred implementation of the adapter is as a component of a fixed, relatively large aperture optical system (e.g., a single telescope that points directly at the earth from a geostationary orbit). With presently available CCD arrays, it is possible to obtain virtually full disk imagery from this sort of implementation with uniform resolution of 4 kilometers or better without a need for moving parts. Curvature correction (for non-LEO satellites) optical components described above herein are not generally applicable for use from variable distances from the spherical object being viewed. However, with the addition of a zoom or similar lens with the functionality to adjust the diameter of an object's image to that expected in the adapter design, a single imaging system may be used for a variety of differing orbits including non-spherical orbits or for monitoring planets, moons, and the like for interplanetary or other space missions.

Figure 11:
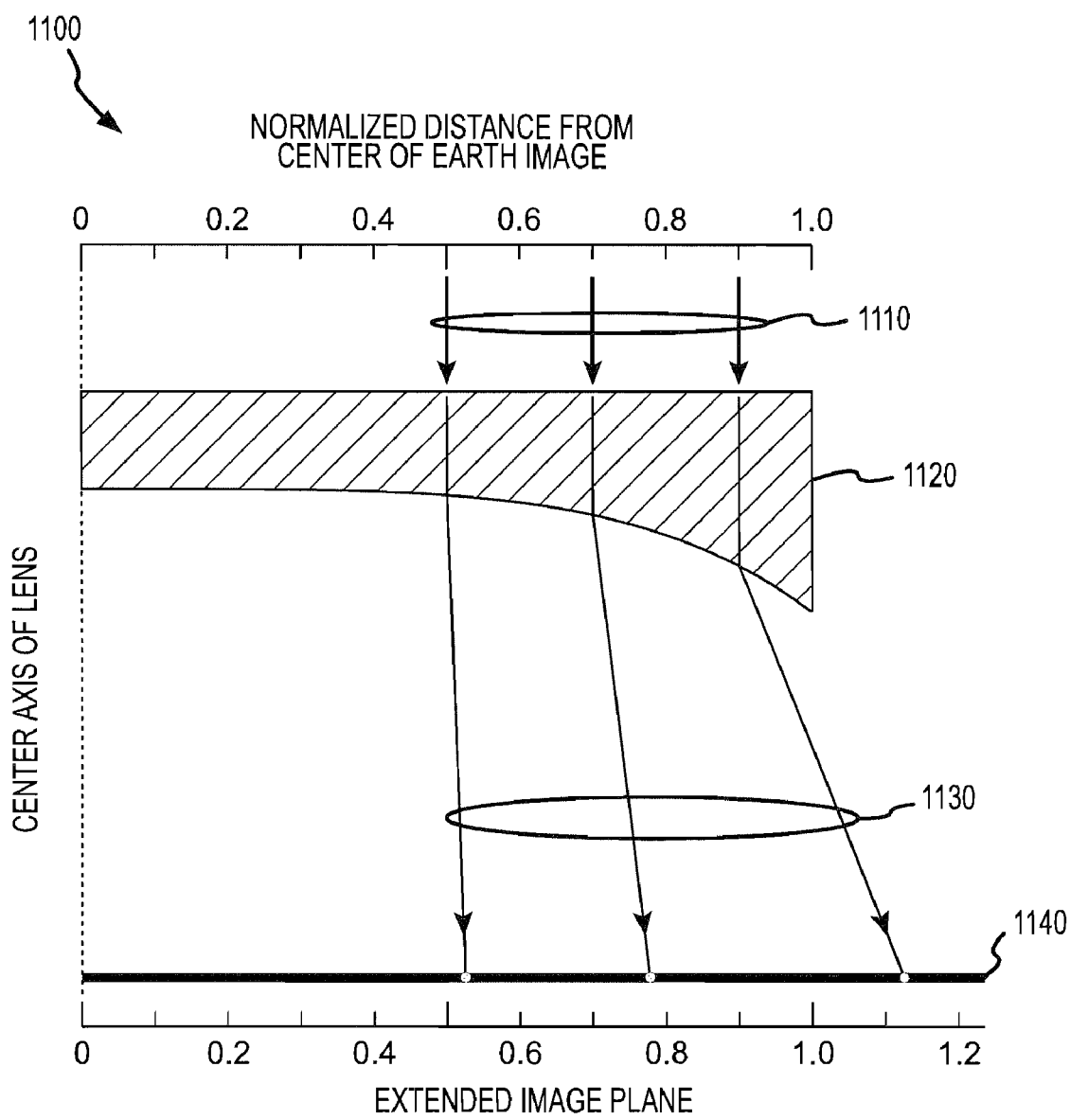
FIG. 11 illustrates a graph of image correction provided by one embodiment of a GeoObs adapter of the invention utilizing a lens.
Figure 12:
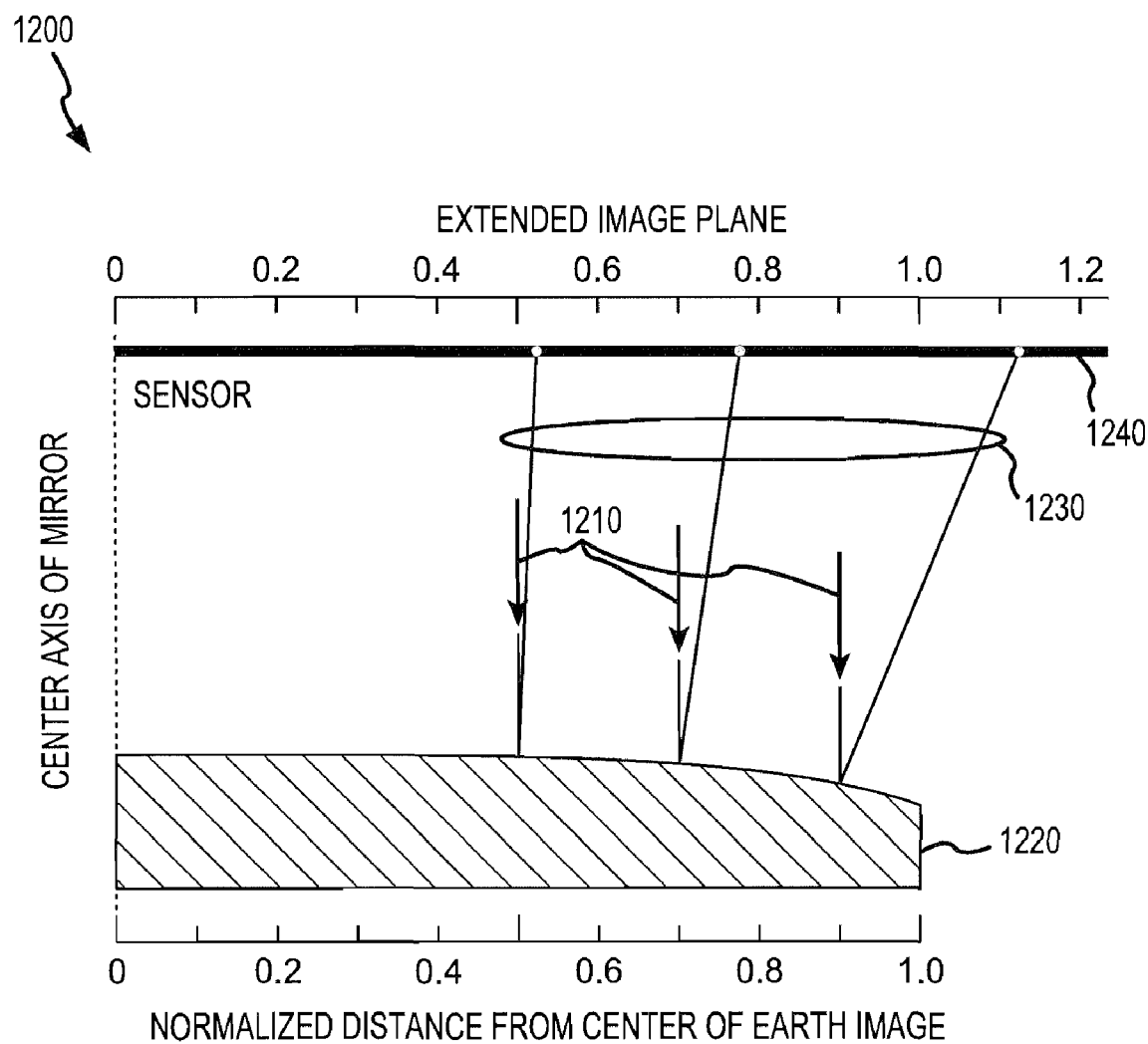
FIG. 12 illustrates a graph similar to FIG. 11 of an image correction provided by another embodiment of a GeoObs adapter of the invention utilizing a mirror.

FIGS. 11 and 12 describe simplified schematic illustrations of GeoObs adapter optical components as concrete examples of the sort of optical components or hardware that may be used to implement the various embodiments of GeoObs adapters described herein. In the "lens" diagram or graph 1100 of FIG. 11 a side view of a lens 1120 is shown with representative shape that may be used but others will be apparent to those skilled in the arts, as well as other embodiments that have the same functionality, based on this description. In this schematic illustration, the distance between the adapter lens and the image plane has been shortened to emphasize the curvature and shape of the lens 1120. The sample parallel rays of light from the earth 1110 (instead of converging and diverging rays) are useful for demonstrating the nature of the bending and stretching that is part of the GeoObs adapter design concept (while limiting additional complications that may occur in practice such as nonparallel input rays).

FIG. 11 illustrates a correction process 1100 that may be carried out by an adapter 1120 according to the invention. The adapter 1120 is shown as a lens (e.g., a lens with a refractive index, n=1.5) that receives sample rays of a raw, collected image 1110 such as from a satellite imaging system collector (such as, but not limited to, a telescope or similar optical devices). The adapter 1120 bends sample rays 1110 in such a way to stretch rays 1130 of the output image and transmits a corrected or transformed image or rays of a transformed image 1130 onto a receiving surface of an image sensor 1140, which typically responds by generating an electronic version of the corrected image. The use of a single lens as the adapter 1120 represents a relatively simple optical path between the collector and the sensor 1140 (or, as previously discussed the functionality of the lens 1120 may be incorporated into the collector itself). In the graph 1100, the normalized radial distance scale is provided at the top showing where correction is occurring within the earth image as seen from the satellite or the collector. In this depiction, the adapter lens 1120 has been extended to allow virtually full acceptance of light rays from the entire width of the input image, well beyond the normal assumed cut off limit expected for typical research and operational applications. While the curvature of the lens becomes increasingly large, it is apparent that the adapter lens itself is capable, in principle, of providing corrected imagery across virtually the entire earth disk, if that is a design parameter. The particular extended image plane 1140 as shown in FIG. 11, however, is only large enough to receive transformed imagery of rays entering the adapter out to a normalized distance from the center of about 0.94.

The lens adapter 1120 is represented by only showing half of the lens from the center to one edge, with the other half of the lens taking on a similar or symmetric shape. The lens adapter 1120 may be termed "plano-concave" or "aspheric plano-concave" or simply "aspheric." It will be apparent to one skilled in the optics field that this is one representative and simple design that can be used to achieve the desired bending or stretching of the image according to the principles of the invention. There are many different ways to provide an adapter to achieve the desired and described functionality, but the lens 1120 is useful for showing that little or no bending of the light rays or stretching or the image is performed in the center of the adapter lens 1120 with progressively more correction being performed for the portions of the image rays 1130 approaching the outer edges of the adapter 1110 to counteract the normal foreshortening of earth features in this region of view. The lens 1120 bends the light rays 1110 using the property of refraction, and, thus, the lens adapter 1120 can be called a refractive solution or embodiment of a GeoObs adapter. The arrows 1110 follow rays of light coming from the earth's surface (e.g., via one or more optical components found in the satellite imaging system or collector (not shown in FIG. 11)) and as they penetrate into the lens 1120 their path is shown bending or being transformed when they leave the lens to strike the image plane where the detectors of the image sensor 1140 are located.

FIG. 12 illustrates a different embodiment of a correction process 1200 according to the invention that is performed by a GeoObs adapter 1220 that uses a mirror to achieve desired transformation or correction of an input image. As with the lens adapter shown in FIG. 11, the mirror adapter 1220 shown in FIG. 12 is shown with representative shape and configuration to illustrate the transformation principle. As shown, input rays of light 1210 such as from an image of an earth disk strikes a surface of the mirror adapter 1220 and are reflected so as to stretch the earth image with an image sensor 1240 positioned to receive the transformed light rays 1230. The process 1200 shows a result comparable to that provided by the process 1100 but is achieved or performed by an adapter 1220 configured for using the property of reflection. Thus, the mirror 1220 can be called a reflective solution or embodiment of the GeoObs adapters of the invention. As with the lens adapter shown in FIG. 11, the mirror adapter in FIG. 12 has been extended to allow virtually full acceptance of light rays from the entire width of the input image, well beyond the normal assumed cut off limit expected for typical research and operational applications. While the adapter mirror 1220 itself is capable, in principle, of providing corrected imagery across virtually the entire earth disk, the particular extended image plane 1240 as shown in FIG. 12, however, is only large enough to receive transformed imagery for rays striking the adapter mirror out to a normalized distance from center of about 0.94. In the embodiment illustrated, the optical path seems to infer that the incoming light 1210 penetrates the eventual image plane 1240, bounces off the mirror 1220, and then hits the image plane sensor array 1240 from below. This is a schematic designed to illustrate the general reflection and mirror shapes required but may readily be designed in a variety of ways that better support the practical geometrical and optical path issues and construction issues of a satellite imaging system. The mirror 1220 may be considered an "aspheric convex mirror." One feature of the mirror 1220 (and of the lens 1120 for that matter) is that it is relatively flat in the area near the central axis of the optical system and exhibits increasing curvature as you move towards the edge. As a result, the correction or transformation process 1200 provides progressive stretching of the image in portions of the mirror 1220 distal from its center and from the center of the image following the specifications revealed in FIG. 10, for example.

Figure 13:
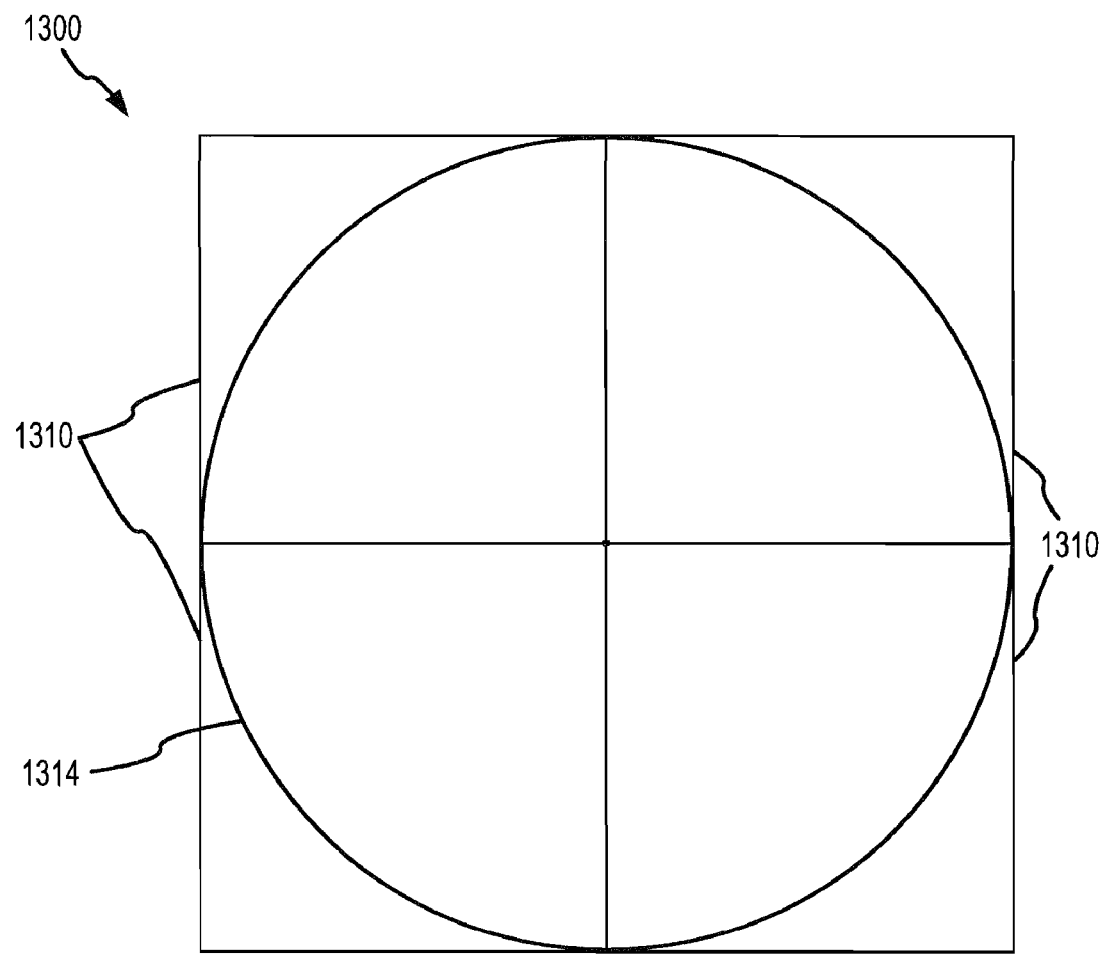
FIG. 13 illustrates an embodiment of an image sensor that may be used with a GeoObs adapter according to an embodiment of the invention.

For some implementations, a GeoObs adapter configured for use with large aperture optical image collecting systems may be used with an image sensor including multiple, high-resolution, 2D CCD focal plane arrays in the form of a large mosaic or individual sensor arrays covering only a portion of the full earth image that may be moved to different positions within the image plane defined by the fixed, large aperture optical system. FIG. 13 illustrates a representative system employing four smaller, 2D CCD focal plane arrays 1300. A corrected earth image 1314 from a GeoObs adapter (not shown in FIG. 13) is received upon the mosaic of four CCDs 1310 that are arranged so as to each receive a portion or subset of the overall corrected image from the adapter and collectively covering virtually the entire earth image. Alternatively, a single component sensor array 1310 covering only a one quarter of the corrected image plane could be sequentially moved around within the fixed, overall field of view of the GeoObs adapter to construct a larger image.

Figure 14:
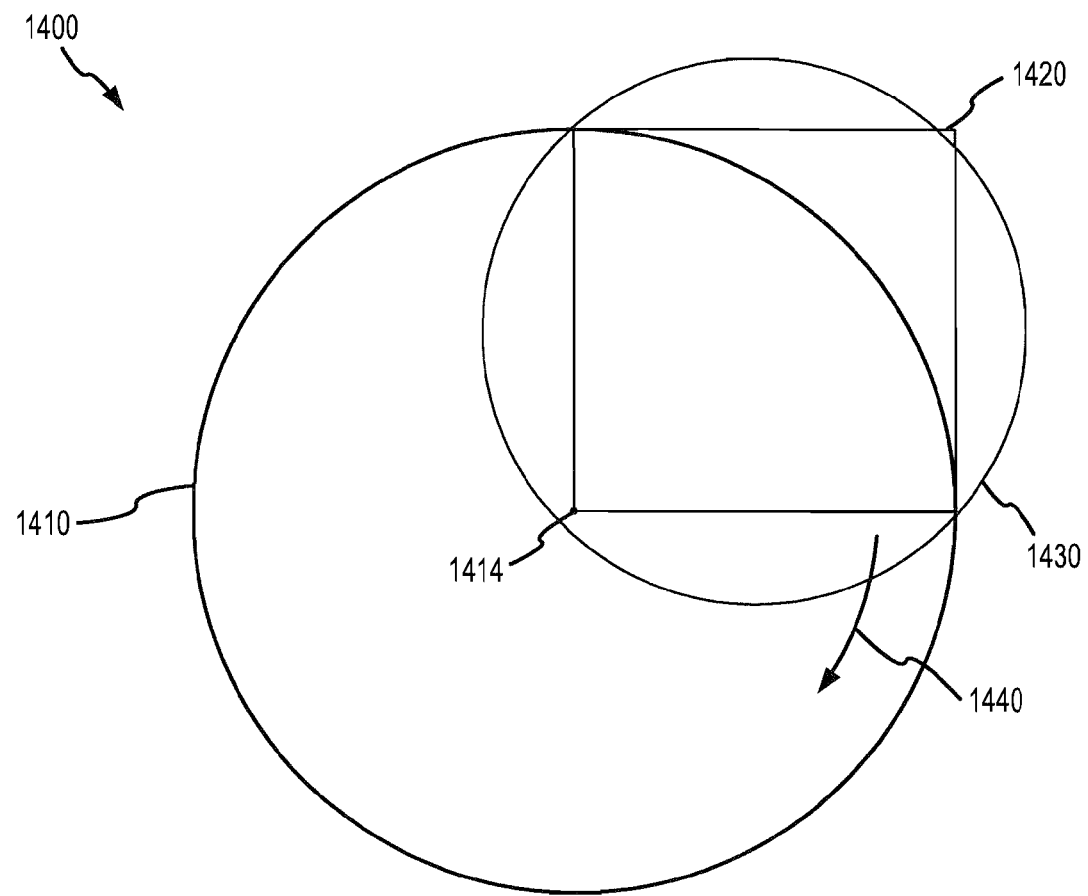
FIG. 14 illustrates an embodiment of a smaller area coverage imaging system of an embodiment of the invention.

For closely monitoring a smaller region, such as the continental United States (CONUS) or Europe, a smaller fixed telescope may be equipped with a smaller adapter that in effect represents a sub-section of the full-disk GeoObs adapter. This approach may be an attractive option for providing uniform resolution imagery with a very high update rate over areas of particular interest. In most applications, this smaller telescope would be permanently pointed at a fixed location on the earth's surface. While this telescope cannot be arbitrarily scanned back and forth across the earth disk, it can be used in a conical scan mode. FIG. 14 illustrates image-collection techniques 1400 with such an embodiment of the invention. In 1400, an appropriate portion of a GeoObs adapter (not shown in FIG. 14) is provided for use with a smaller telescope with a field of view 1430 and its own 2D CCD sensor array 1420. The telescope along with its collecting device and sensors can either remain fixed or be rotated about the center of the earth image 1412 in a conical scan mode as shown by arrow 1440. The rotating telescope could continuously collect image data as it rotates or alternatively rotate 90 degrees to a new observing position and stop to make observations at this point until moving on to cover a new quadrant of the overall earth image.

Figure 15:
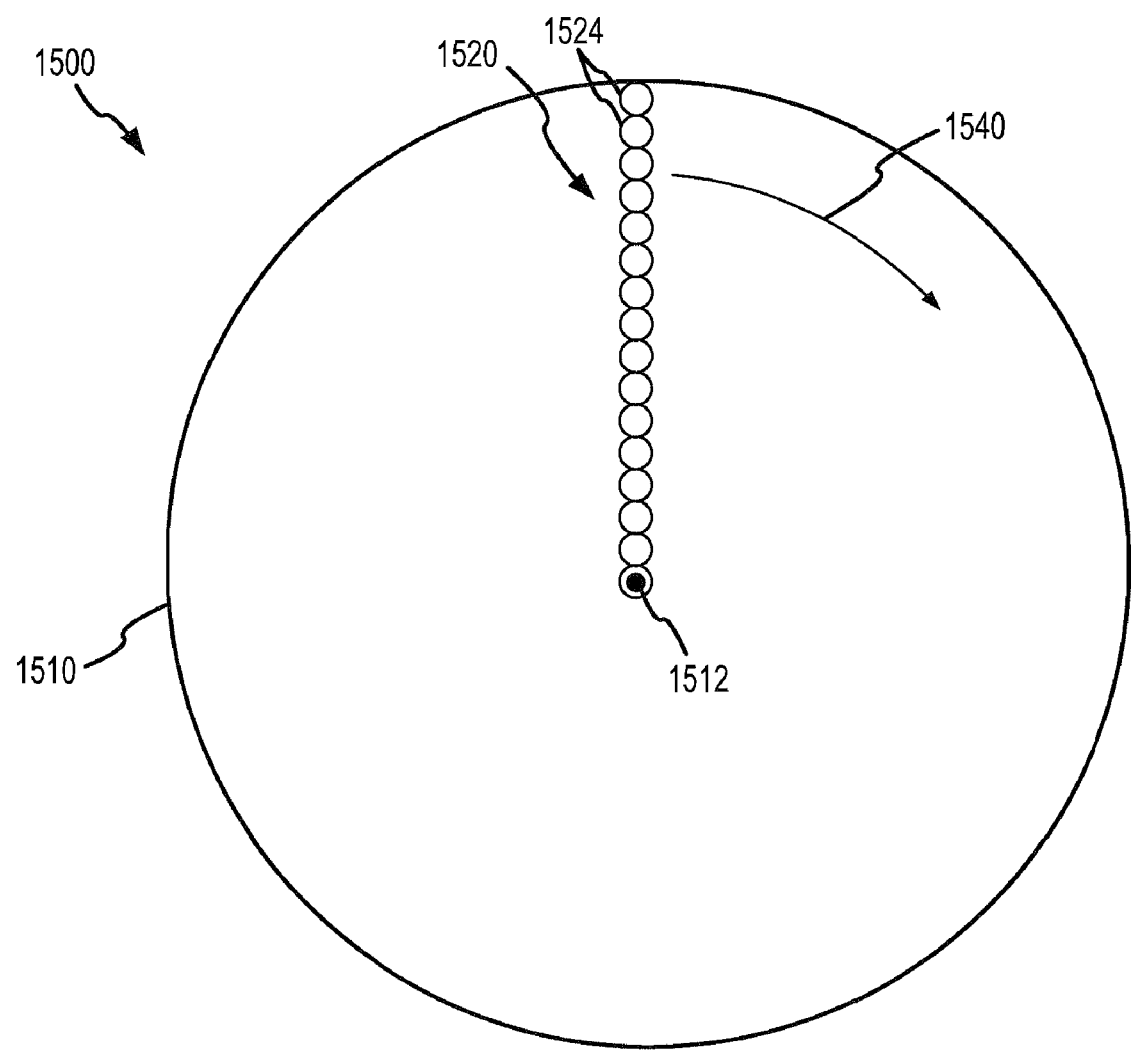
FIG. 15 illustrates another embodiment of an imaging system of the present invention in which conical scanning is performed with use of a linear GeoObs adapter.

While the adapter concept is well suited for two-dimensional, circularly symmetric optical systems paired with 2D sensor arrays, the optical stretching concept and function may also be applied to a linear detector array extending across the center of an axisymmetric GeoObs adapter of the sort described above or in combination with a special one-dimensional optical adapter. In this configuration, the linear sensor and its companion optical system are rotated in a conical scan mode. FIG. 15 illustrates one such embodiment showing an imaging process 1500 of the invention in which an earth disk 1510 with a center 1512 is imaged with distortion being corrected by a linear array 1520 of image sensors that are paired with a linear subset of a GeoObs adapter (not shown). The correction by the linear adapter portion and gathered or sensed by the individual sensing elements 1524 corrects imagery along a radial line extending out from the center 1512 of the earth disk rather than over the full 2D image 1510. The linear sensor array 1520 rotates as shown by arrow 1540 in a conical scan mode with rotation centered on the center of the earth disk 1512 with the sequential observations combined to generate a corrected image covering the entire scanned domain. The embodiment of FIG. 15 may be used in a satellite or other platform orbiting in a geostationary orbit or in what is called "low earth orbit" (LEO) such as employed by polar-orbiting satellites. In both embodiments, the GeoObs adapter could be scanned in a conical scan mode, with the instrument axis pointing straight down towards the center of the earth, just as in a geostationary embodiment. From LEO, however, the satellite is moving with respect to the earth below so it has a limited dwell time staring at any one location.

Figure 16:
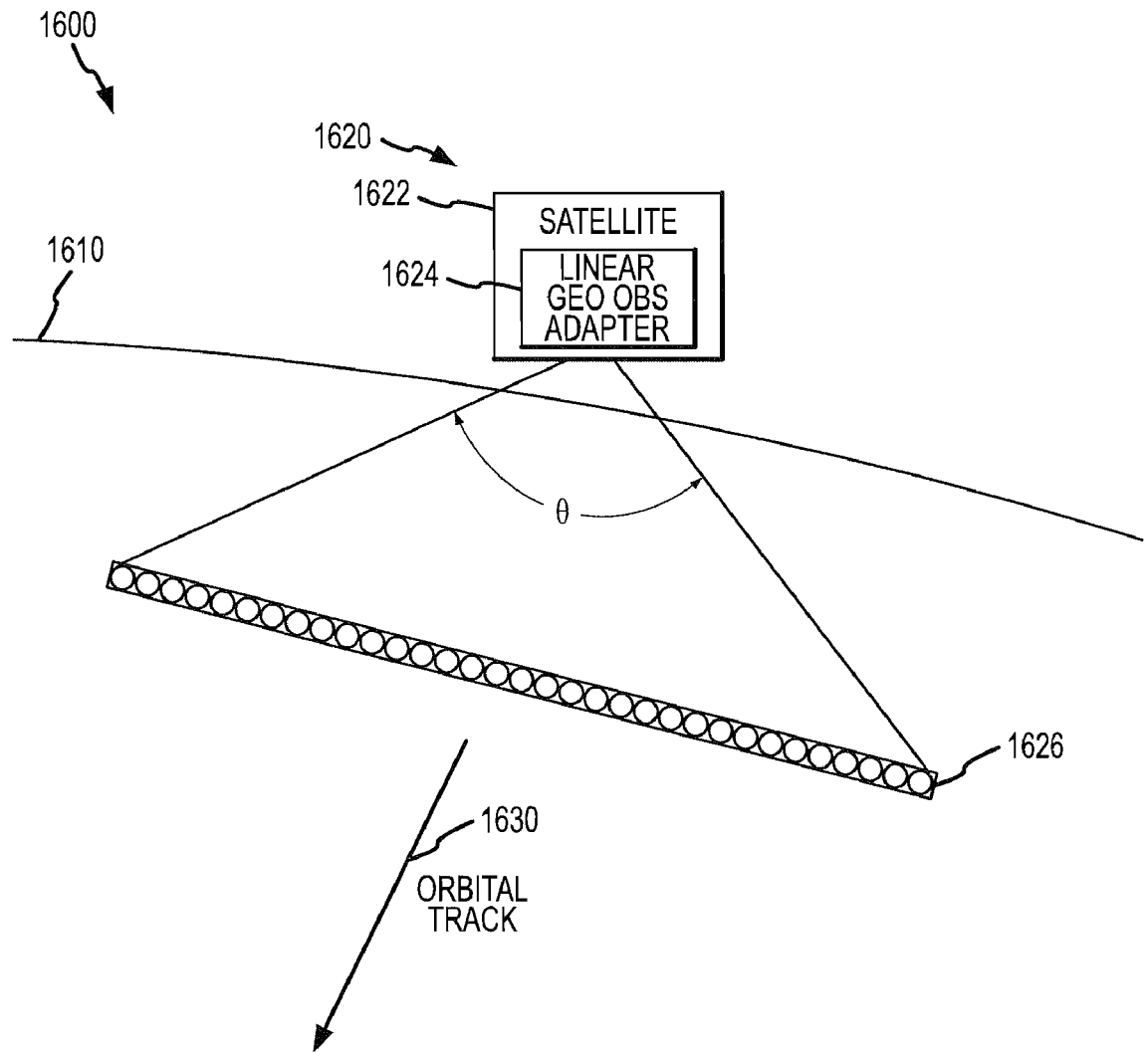
FIG. 16 illustrates a low earth orbiting imaging system according to an embodiment of the invention.

In a unique embodiment, such as the embodiment shown in FIG. 16, an imaging process 1600 may be performed by a satellite in low earth orbit (LEO) with a linear GeoObs adapter 1624 that is paired with a linear image sensor array 1626, depicted in terms of its projection onto the sensing swath, while the satellite 1620 follows an orbital track 1630 perpendicular to the orientation of the sensor array. The imaging 1600 would be performed from low earth orbit with the satellite 1622 having its telescope or image collection system pointed downward and used as a single, fixed, cross-track pushbroom sensor array (e.g., 1626) that achieves correction when combined with the linear GeoObs adapter 1624. In this embodiment, the adapter 1624 may be considered as a desirable optical alternative to designs presently being considered that involve relatively complex segmented cross-track scanning sensor arrays with segmented sensor elements that change their configuration at different points in the scan. The cross-track pushbroom system 1620 provides uniform resolution imagery across the full swath width (as defined by angle, $\theta$, and linear sensor array 1626) with sequential time resolved samples providing two-dimensional coverage. The wide angular swath, often as broad as 110 degrees, may be better covered by use of multiple telescopes or other optical systems provided on or attached to the satellite platform 1622. In a preferred embodiment, the system 1620 is operated with a constant downward point angle or angles with no scanning motions provided other than those provided by the movement of the satellite 1622 along the orbital track 1630.

Using a linear array of sensors, perhaps especially in LEO, introduces some additional design options that may be useful to describe, e.g., using a linear lens system rather than or in addition to the axisymmetric system described in many of the embodiments discussed above. The linear design may use the same or similar design criteria for stretching but rather than stretching a 2D image in radial directions, it may need to only stretch the image along one (e.g., cross-track scanning) direction. This is an unusual lens design, but one that would be readily understood by those skilled in the optical arts. A linear lens design may also be useful for incorporating the GeoObs adapter in multispectral imaging instruments (i.e., instruments that collect data at a variety of wavelengths). While not required in all embodiments, most embodiments of the GeoObs adapter may include requirements for imagery from a variety of wavelengths. This is perhaps readily accomplished using a mirror adapter since all wavelengths of light are reflected equally, with this type of design being well established, e.g., the Hubble Space Telescope that makes multi-spectral observations using a mirror optics by introducing a "filter-wheel" into the optical path that sequentially limits the light hitting the telescope's 2D sensor array specific wavelengths of light and combining the images from each wavelength into a single data file. Although refractive lenses bend light at different wavelengths differently and are more difficult to use for multi-spectral sensing, embodiments of the GeoObs adapter may be constructed using refractive lenses and the lens selection and construction is not considered a limiting factor of the present invention. Also, with a linear lens and linear sensor-array system, oblique imaging designs are more feasible and could be used as an alternative to a vertical or downward pointing sensing instrument.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For the geostationary orbit configuration or embodiments of the GeoObs adapter discussed above, the image transformation performed by the optical adapter involves progressively "stretching" the image in a radial direction (e.g., directly away from the center in any direction). A typical orientation of remote sensing instrument or imaging system components on a satellite incorporating the adapter would be looking or targeting straight down towards the center of the earth (i.e., vertical orientation). In this orientation, the observing geometry and the optical system itself is "axisymmetric" (i.e., symmetric around a line from the satellite instrument towards the center of the earth) in the sense of a rotation. Since the "corrections" to the normal perspective view of the earth from space are in a radial direction, it is not limiting how the adapter is rotated in a circular sense around the main axis. In satellite terminology, this sort of rotation is frequently termed conical scanning. Thus, even a small sub-section of the proposed adapter lens or mirror located off-center from the main axis but constructed following the axisymmetric design criteria can be used to "scan" the earth by using conical scanning.

In some preferred embodiments, however, the geostationary version of the adapter is used in the form of a single, fixed optical system capable of looking at a large portion of the earth disk as viewed from space, with no or limited numbers of moving parts. This results in imaging systems that are simple in design, lighter in weight, and lower cost, with these beneficial attributes providing a part of the appeal of the invention. At the same time, embodiments in which there is no need for scanning back and forth to build up an image of the earth using a conventional scanning radiometer increases the amount of time that the instrument or imaging system can look at or target any one spot on the earth's surface, which increases the instrument's signal-to-noise ratio to provide better data. This may be important in some applications since the "stretching" done by the optical adapter in of itself may minimally reduce the energy flux being detected by any one pixel in a CCD array or other image sensor. However, this effect should be not be consequential due to the longer dwell time that is provided by use of the GeoObs adapter. The GeoObs adapter is typically embodied with an "axisymmetric" optical design that makes it easier to construct (e.g., many conventional lenses are axisymmetric). However, other embodiments may involve constructing a version of the geostationary GeoObs adapter that looks obliquely at the earth (i.e., not straight down). In these embodiments, the lens, mirror, or other optical components would likely no longer be axisymmetric.

I claim:

1. An imaging system for use in transforming images of a spherical body during image collection, comprising:
    an image collector collecting an image of the body from a distance above the body, wherein the collected image is substantially disk shaped and includes distortion in portions that are radially spaced apart from a center of the disk-shaped image, wherein at least some of the radially-spaced, distorted portions extend along a line of longitude and at least some of the radially-spaced, distorted portions extend along a line of latitude that is generally perpendicular to the line of longitude; and wherein the distortion is due to curvature of the spherical body or due to oblique viewing angles;
    an optical adapter receiving the collected image and transmitting a corrected image comprising the collected image with a correction to enhance resolution in the distorted portions; and
    an image sensor with a receiving surface for sensing the corrected image.

2. The system of claim 1, wherein the corrected image is transformed by the optical adapter to have substantially uniform resolution.

3. The system of claim 1, wherein the imaging system is mounted upon a satellite for use in geostationary orbit and the image collector comprises a fixed telescope in geostationary orbit directed straight downward towards the center of the spherical body.

4. The system of claim 1, wherein the correction to enhance resolution comprises radial stretching segments of the collected image in the distorted portions that are radially spaced apart from a center of the disk-shaped image to have a size substantially equivalent to image segments that are near the center of the collected image relative to the distorted portions.

5. The system of claim 4, wherein the corrected image has a diameter that is larger than the collected image by a factor of less than 1.4.

6. The system of claim 1, wherein the corrected image has a diameter that is substantially equivalent or smaller than a diameter of the collected image.

7. The system of claim 1, wherein the optical adapter is provided as an integral component of the image collector.

8. The system of claim 1, wherein the correction to enhance resolution is selected from a group of corrections consisting of equal area correction, curvature correction, equidistant correction, and stereographic correction.

9. The system of claim 8, wherein the optical adapter is configured based on a radial stretching factor that defines an amount of stretching applied to the collected image relative to the center of the collected image and wherein the radial stretching factor is defined by a curve corresponding to the correction selected from the group of corrections.

10. The system of claim 1, wherein the optical adapter provides the correction of the collected image applying pincushion distortion to the collected image.

11. An optical adapter for use in a remote sensing system for correction of distortions due to earth curvature or oblique viewing angles, comprising:
    a first component for receiving an earth view comprising portions that are relatively near an edge of the earth view that are distorted relative to portions of the earth view that are relatively near a center of the earth view, wherein the distortions are due to earth curvature or oblique viewing angles;
    one or more optical components for generating a corrected earth view by progressively transforming the distorted portions to correct at least a portion of distortion in the received earth view; wherein the one or more optical components substantially continuously transform the earth view from the portions that are relatively near a center of the earth view to the distorted portions that are relatively near an edge of the earth view; and
    a second component for transmitting the corrected earth view to a sensor.

12. The adapter of claim 11, wherein the one or more optical components are configured to distort the earth view to provide uniform resolution across substantially all of the earth view.

13. The adapter of claim 11, wherein the one or more optical components comprise an aspheric lens or mirror with increasing curvature near an edge portion.

14. The adapter of claim 11, wherein the earth view is divided into two or more areas and wherein each of the areas is transformed separately to correct for distortion.

15. The adapter of claim 11, wherein the received earth view is collected by the remote sensing system at an offset from nadir using conical scanning.

16. The adapter of claim 11, wherein the adapter is configured for transforming linear sections of the earth view and wherein the remote sensing system comprises a linear array that is conically scanned to gather linear sections.

17. The adapter of claim 11, wherein the remote sensing system comprises a linear array that is operated using a pushbroom scan to gather linear sections that are transformed by the adapter.

18. A method for correcting geostationary satellite imagery, comprising:
    obtaining an earth image comprising portions distal to a center of the earth image with distortion due to curvature effects; wherein at least some of the portions extend along a line of longitude and at least some of the portions extend along a line of latitude that is generally perpendicular to the line of longitude;
    radially stretching at least some of the portions that extend along the line of longitude and at least some of the portions that extend along the line of latitude of the earth image having distortion to correct for the curvature effects to generate a corrected earth image; and
    transmitting the corrected earth image onto an image sensor.

19. The method of claim 18, wherein the stretching is performed at a greater rate on image segments in the portions near an edge of the earth image and wherein coverage of the corrected earth image extends outward from nadir by an earth angle of less than 65 degrees.

20. The method of claim 18, wherein the stretching is performed with an aspheric lens or mirror with greater curvature near its edge and wherein the stretching is performed such that substantially uniform resolution is provided across the corrected earth image.

* * * * *